United States Patent
Xia et al.

(10) Patent No.: US 10,440,714 B2
(45) Date of Patent: Oct. 8, 2019

(54) FREQUENCY DOMAIN RESOURCE CONFIGURATION METHOD AND APPARATUS

(71) Applicant: Huawei Technologies Co., Ltd., Shenzhen (CN)

(72) Inventors: Jinhuan Xia, Beijing (CN); Brian Classon, Beijing (CN); Matthew William Webb, Issy les Moulineaux (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/829,391

(22) Filed: Dec. 1, 2017

(65) Prior Publication Data
US 2018/0092101 A1  Mar. 29, 2018

Related U.S. Application Data

(63) Continuation of application No. PCT/CN2015/080616, filed on Jun. 3, 2015.

(51) Int. Cl.
*H04W 4/00* (2018.01)
*H04W 72/04* (2009.01)
(Continued)

(52) U.S. Cl.
CPC ....... *H04W 72/0453* (2013.01); *H04L 5/0012* (2013.01); *H04L 5/0094* (2013.01);
(Continued)

(58) Field of Classification Search
CPC .......... H04L 2463/101; H04L 25/0328; H04L 5/0012; H04L 5/0048; H04L 5/0053; H04L 5/0094; H04W 72/042; H04W 72/0453
See application file for complete search history.

(56) References Cited

U.S. PATENT DOCUMENTS 6,275,518 B1  8/2001  Takahashi et al.
2007/0217362 A1*  9/2007  Kashima ............... H04W 72/04
370/330

(Continued)

FOREIGN PATENT DOCUMENTS

CN  1956432 A  5/2007
CN  101217306 A  7/2008
(Continued)

OTHER PUBLICATIONS

"3rd Generation Partnership Project; Technical Specification Group Radio Access Network; Study on Provision of Low-Cost Machine—Type Communications (MTC) User Equipments (UEs) based on LTE (Release 12)," 3GPP TR 36.888 V12.0.0,. Jun. 2013, 55 pages.
(Continued)

*Primary Examiner* — Minh Trang T Nguyen
(74) *Attorney, Agent, or Firm* — Slater Matsil, LLP

(57) ABSTRACT

A frequency domain resource configuration method and apparatus, the method including obtaining, by a base station, a first frequency hopping parameter set of UE in N sub-bands, where the N sub-bands have a mapping relationship with a frequency hopping pattern that is indicated by the first frequency hopping parameter set, where the sub-band is a length of consecutive frequency domain resources in a system bandwidth, and where $N \geq 1$, and further including sending, by the base station, first configuration information to the UE, where the first configuration information includes sub-band identifiers of the N sub-bands and the first frequency hopping parameter set.

13 Claims, 9 Drawing Sheets

(51) Int. Cl.
*H04L 5/00* (2006.01)
*H04L 25/03* (2006.01)
(52) U.S. Cl.
CPC ......... *H04W 72/042* (2013.01); *H04L 5/0048* (2013.01); *H04L 5/0053* (2013.01); *H04L 25/0328* (2013.01); *H04L 2463/101* (2013.01)

(56) References Cited

U.S. PATENT DOCUMENTS

| | | | |
|---|---|---|---|
| 2009/0238241 A1* | 9/2009 | Hooli | H04B 1/7143 375/133 |
| 2010/0246638 A1* | 9/2010 | Mehta | H04B 1/713 375/133 |
| 2011/0007779 A1 | 1/2011 | Nanri | |
| 2011/0235684 A1* | 9/2011 | Dahlman | H04B 1/59 375/135 |
| 2011/0310931 A1* | 12/2011 | Mehta | H01Q 1/246 375/133 |
| 2012/0120888 A1* | 5/2012 | Miao | H04B 1/7143 370/329 |
| 2015/0256403 A1* | 9/2015 | Li | H04W 4/70 370/235 |
| 2015/0373571 A1* | 12/2015 | Chincholi | H04W 16/14 370/330 |
| 2016/0081084 A1* | 3/2016 | Blankenship | H04W 4/70 370/329 |
| 2016/0081101 A1 | 3/2016 | Yu | |
| 2016/0344526 A1* | 11/2016 | Fan | H04L 5/0048 |
| 2018/0069593 A1* | 3/2018 | Yi | H04B 1/713 |

FOREIGN PATENT DOCUMENTS

| | | |
|---|---|---|
| CN | 103546194 A | 1/2014 |
| CN | 103716841 A | 4/2014 |
| EP | 2903334 A1 | 8/2015 |
| JP | H08204615 A | 8/1996 |
| JP | 2001358615 A | 12/2001 |
| JP | 2009231950 A | 10/2009 |
| WO | 2012064098 A2 | 5/2012 |
| WO | 2014048261 A1 | 4/2014 |
| WO | 2014190537 A1 | 12/2014 |

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V12.5.0, Mar. 2015, 136 pages.

"3rd Generation Partnership Project; Technical Specification Group Radio Access Network; Evolved Universal Terrestrial Radio Access (E-UTRA); Multiplexing and Channel Coding (Release 12)," 3GPP TS 36.212 V12.4.0 , Mar. 2015, 94 pages.

"3rd Generation Partnership Project; Technical Specification Group Radio Access Network; Evolved Universal Terrestrial Radio Access (E-UTRA);Physical Layer Procedures (Release 12)," 3GPP TS 36.213 V12.5.0, Mar. 2015, 239 pages.

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.5.0, Mar. 2015, 445 pages.

"PDSCH for LC-MTC," Agenda Item: 6.2.1.3, Source: Alcatel-Lucent, Alcatel-Lucent Shanghai Bell, Document for: Discussion/Decision, 3GPP TSG RAN WG1 Meeting #81, R1-152602, Fukuoka, Japan, May 25-29, 2015, 5 pages.

"Frequency hopping method for PUSCH," Agenda item: 6.2.5, Source: LG Electronics, Document for: Discussion and decision, 3GPP TSG RAN WG1 #50bis, R1-074209, Shanghai, China, Oct. 8-12, 2007, 5 pages.

"PRB group definition and frequency hopping for MTC enhancement," Source: ZTE, Agenda item: 6.2.1.1, Document for: Discussion and Decision, 3GPP TSG RAN WG1 Meeting #81, R1-152954, Fukuoka, Japan, May 25-29, 2015, 6 pages.

"Scheduling principles," Agenda item: 5.2.3, Source: Qualcomm Europe, Document for: Discussion and Decision, 3GPP TSG RAN2 #56-bis, R2-070211, Sorrento, Italy, Jan. 15-19, 2007, 6 pages.

* cited by examiner

FREQUENCY DOMAIN RESOURCE CONFIGURATION METHOD AND APPARATUS

CROSS-REFERENCE TO RELATED APPLICATIONS

This application is a continuation of International Application No. PCT/CN2015/080616, filed on Jun. 3, 2015, the disclosure of which is hereby incorporated by reference in its entirety.

TECHNICAL FIELD

The present invention relates to the communications field, and in particular, to a frequency domain resource configuration method and apparatus.

BACKGROUND

In an LTE (long term evolution) system, there are multiple defined system bandwidths, such as 1.4 MHz, 5 MHz, 10 MHz, 15 MHz, and 20 MHz. A system bandwidth may be further divided into some sub-bands. That is, a sub-band is a length of consecutive frequency domain resources (a bandwidth of the sub-band is generally less than or equal to 1.4 MHz) that is in the system bandwidth and that is less than the system bandwidth. Generally, a PRB (physical resource block) is used as a unit.

Currently, a base station generally configures one or more sub-bands for UE in a broadcasting manner, so that the UE communicates with the base station in a corresponding frequency band by using the sub-bands configured by the base station. That is, the UE may use only one or more fixed frequency bands to communicate with the base station. In this way, when the sub-bands configured by the base station for the UE have relatively poor communication performance, and the UE can use only the configured sub-bands to communicate with the base station, the UE may not normally interact with the base station in an excessively long time. This reduces quality of communication between the UE and the base station and resource utilization of each sub-band in the system bandwidth.

SUMMARY

Embodiments of the present invention provide a frequency domain resource configuration method and apparatus, to improve quality of communication between UE and a base station and resource utilization of each sub-band in a system bandwidth to some extent.

To achieve the foregoing objective, the following technical solutions are used in the embodiments.

According to a first aspect, an embodiment of the present invention provides a frequency domain resource configuration method, including obtaining, by a base station, a first frequency hopping parameter set of UE in N sub-bands, where there is a mapping relationship between the N sub-bands and a frequency hopping pattern that is indicated by the first frequency hopping parameter set, the sub-band is a length of consecutive frequency domain resources in a system bandwidth, and N≥1, and sending, by the base station, first configuration information to the UE, where the first configuration information includes sub-band identifiers of the N sub-bands and the first frequency hopping parameter set.

With reference to the first aspect, in a first possible implementation of the first aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where Z≥Y≥X>0.

With reference to the first aspect or the first possible implementation of the first aspect, in a second possible implementation of the first aspect, the N sub-bands are used to transfer one or more of the following: unicast data between the base station and the UE, a downlink control channel for scheduling the unicast data, an uplink control channel for scheduling the unicast data, a physical random access channel for scheduling the unicast data, a public message, a scheduling parameter for scheduling the public message, and a control channel carrying the scheduling parameter, where the unicast data carries a cyclic redundancy check CRC bit scrambled by using a specified radio network temporary identifier RNTI of the UE, and a transport block TB of the UE, and the public message includes at least one of the following: system information SI, a random access response RAR, and paging information.

With reference to the first possible implementation of the first aspect or the second possible implementation of the first aspect, in a third possible implementation of the first aspect, after the sending, by the base station, first configuration information to the UE, the method further includes generating, by the base station, second configuration information according to the N sub-bands, where the second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data, the M sub-bands are any subset of the N sub-bands, and 1≤M≤N, and sending, by the base station, the second configuration information to the UE.

With reference to the third possible implementation of the first aspect, in a fourth possible implementation of the first aspect, the second configuration information further includes a second frequency hopping parameter set, and there is a mapping relationship between the M sub-bands and a frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the first aspect or the second possible implementation of the first aspect, in a fifth possible implementation of the first aspect, after the sending, by the base station, first configuration information to the UE, the method further includes sending, by the base station, third configuration information to the UE, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, the H sub-bands are used to transfer at least one of the following: unicast data between the base station and the UE, a downlink control channel for scheduling the unicast data, an uplink control channel for scheduling the unicast data, or a physical random access channel for scheduling the unicast data, and N≥H≥1, and the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter.

With reference to the first possible implementation of the first aspect or the second possible implementation of the first aspect, in a sixth possible implementation of the first aspect, after the sending, by the base station, first configuration information to the UE, the method further includes sending, by the base station, fourth configuration information to the UE, where the fourth configuration information carries sub-band identifiers of K sub-bands, at least one of the K sub-bands does not belong to the N sub-bands, the K sub-bands are used to transfer at least one of the following: unicast data between the base station and the UE, a downlink control channel for scheduling the unicast data, an uplink control channel for scheduling the unicast data, or a physical random access channel for scheduling the unicast data, and K≥1.

With reference to the sixth possible implementation of the first aspect, in a seventh possible implementation of the first aspect, the fourth configuration information further includes a fourth frequency hopping parameter set, and there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first to the seventh possible implementations of the first aspect, in an eighth possible implementation of the first aspect, the sub-bands are used by the UE to receive a downlink control channel, and downlink control information carried in the downlink control channel carries sub-band identifiers of L sub-bands of a data channel associated with the downlink control channel, the L sub-bands are any sub-bands in the system bandwidth, and 1≤L.

With reference to the eighth possible implementation of the first aspect, in a ninth possible implementation of the first aspect, the downlink control information carried in the downlink control channel further carries a fifth frequency hopping parameter set, there is a mapping relationship between the L sub-bands and a frequency hopping pattern that is indicated by the fifth frequency hopping parameter set, and the fifth frequency hopping parameter set is determined by at least one of the following: the sub-band identifiers of the L sub-bands, a quantity L of the sub-bands, or the value of the frequency hopping parameter.

With reference to the eighth possible implementation of the first aspect, in a tenth possible implementation of the first aspect, if the sub-bands are sub-bands of the downlink control channel for scheduling the unicast data, the first configuration information, the second configuration information, the third configuration information, or fourth configuration information further carries a fifth frequency hopping parameter set, where there is a mapping relationship between the L sub-bands and a frequency hopping pattern that is indicated by the fifth frequency hopping parameter set, and the fifth frequency hopping parameter set is determined by at least one of the following: the sub-band identifiers of the L sub-bands, a quantity L of the sub-bands, or the value of the frequency hopping parameter.

With reference to the first to the tenth possible implementations of the first aspect, in an eleventh possible implementation of the first aspect, the sending, by the base station, first configuration information to the UE includes sending, by the base station, the first configuration information to the UE according to a sixth frequency hopping parameter set, where there is a mapping relationship between W sub-bands and a frequency hopping pattern that is indicated by the sixth frequency hopping parameter set, the W sub-bands are pre-stored on the base station, or carried in a master information block (MIB), and W≥1, and the sixth frequency hopping parameter set is determined by at least one of the following: sub-band identifiers of the W sub-bands, a quantity W of the sub-bands, or the value of the frequency hopping parameter.

With reference to the first to the eleventh possible implementations of the first aspect, in a twelfth possible implementation of the first aspect, the sending, by the base station, first configuration information to the UE includes sending, by the base station, the first configuration information to the UE by using first signaling, where the first signaling includes first system information SI or radio resource control RRC signaling.

With reference to the second to the eleventh possible implementations of the first aspect, in a thirteenth possible implementation of the first aspect, the sending, by the base station, second configuration information to the UE includes sending, by the base station, the second configuration information to the UE by using second signaling, where the second signaling includes Media Access Control MAC signaling or RRC signaling.

With reference to the fourth to the eleventh possible implementations of the first aspect, in a fourteenth possible implementation of the first aspect, the sending, by the base station, third configuration information to the UE includes sending, by the base station, the third configuration information to the UE by using third signaling, where the third signaling includes MAC signaling or RRC signaling.

With reference to the fifth to the eleventh possible implementations of the first aspect, in a fifteenth possible implementation of the first aspect, the sending, by the base station, fourth configuration information to the UE includes sending, by the base station, the fourth configuration information to the UE by using fourth signaling, where the fourth signaling includes MAC signaling or RRC signaling.

According to a second aspect, an embodiment of the present invention provides a frequency domain resource configuration method, including receiving, by UE, first configuration information sent by a base station, where the first configuration information includes sub-band identifiers of N sub-bands and a first frequency hopping parameter set in the N sub-bands, there is a mapping relationship between the N sub-bands and a frequency hopping pattern that is indicated by the first frequency hopping parameter set, the sub-band is a length of consecutive frequency domain resources in a system bandwidth, and N≥1 and determining, by the UE according to the sub-band identifiers of the N sub-bands and the first frequency hopping parameter set, a frequency domain resource used for communication with the base station.

With reference to the second aspect, in a first possible implementation of the second aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where Z≥Y≥X>0.

With reference to the first possible implementation of the second aspect, in a second possible implementation of the second aspect, after the determining, by the UE according to the sub-band identifiers of the N sub-bands and the first frequency hopping parameter set, a frequency domain resource used for communication with the base station, the method further includes receiving, by the UE, second configuration information sent by the base station, where the second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data, the M sub-bands are any subset of the N sub-bands, and 1≤M≤N, and determining, by the UE according to the second configuration information, a frequency domain resource used to send, to the base station, at least one of the following: the unicast data, the downlink control channel for scheduling the unicast data, the uplink control channel for scheduling the unicast data, or the physical random access channel for scheduling the unicast data, where the unicast data carries a cyclic redundancy check CRC bit scrambled by using a specified radio network temporary identifier RNTI of the UE, and a transport block TB of the UE.

With reference to the second possible implementation of the second aspect, in a third possible implementation of the second aspect, the second configuration information further includes a second frequency hopping parameter set, and there is a mapping relationship between the M sub-bands and a second frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the second aspect, in a fourth possible implementation of the second aspect, after the determining, by the UE according to the sub-band identifiers of the N sub-bands and the first frequency hopping parameter set, a frequency domain resource used for communication with the base station, the method further includes receiving, by the UE, third configuration information sent by the base station, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, N≥H≥1, and the third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter, and determining, by the UE according to the third frequency hopping parameter set, a frequency domain resource used for communication with the base station in the consecutive subframe time Y in which a frequency domain location does not change.

With reference to the first possible implementation of the second aspect, in a fifth possible implementation of the second aspect, after the determining, by the UE according to the sub-band identifiers of the N sub-bands and the first frequency hopping parameter set, a frequency domain resource used for communication with the base station, the method further includes receiving, by the UE, fourth configuration information sent by the base station, where the fourth configuration information carries sub-band identifiers of K sub-bands, at least one of the K sub-bands does not belong to the N sub-bands, and K≥1, and determining, by the UE according to the fourth configuration information, a frequency domain resource used to transfer at least one of the following to the base station: the unicast data, a downlink control channel for scheduling the unicast data, an uplink control channel for scheduling the unicast data, or a physical random access channel for scheduling the unicast data.

With reference to the fifth possible implementation of the second aspect, in a sixth possible implementation of the second aspect, the fourth configuration information further includes a fourth frequency hopping parameter set, and there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first possible implementation of the second aspect, in a seventh possible implementation of the second aspect, if the sub-bands are used by the UE to receive the downlink control channel, the UE obtains, from the downlink control channel, sub-band identifiers of L sub-bands of a data channel associated with the downlink control channel, the L sub-bands are any sub-bands in the system bandwidth, and $1 \leq L$.

With reference to the seventh possible implementation of the second aspect, in an eighth possible implementation of the second aspect, if the sub-bands are sub-bands of the downlink control channel for scheduling the unicast data, the first configuration information, the second configuration information, the third configuration information, or the fourth configuration information further carries a fifth frequency hopping parameter set, and the method further includes obtaining, by the UE, the fifth frequency hopping parameter set from the downlink control channel, or obtaining, by the UE, the fifth frequency hopping parameter set from the first configuration information, the second configuration information, the third configuration information, or the fourth configuration information, where there is a mapping relationship between the L sub-bands and a frequency hopping pattern that is indicated by the fifth frequency hopping parameter set, and the fifth frequency hopping parameter set is determined by a value/values of one or more of the frequency hopping parameters.

With reference to the eighth possible implementation of the second aspect, in a ninth possible implementation of the second aspect, if the sub-band identifiers of the L sub-bands are the same as sub-band identifiers of the downlink control channel, the UE determines that a sub-band of the data channel is the same as a sub-band of the downlink control channel, or if the sub-band identifiers of the L sub-bands are different from sub-band identifiers of the downlink control channel, the UE determines a sub-band of the data channel according to the fifth frequency hopping parameter set.

According to a third aspect, an embodiment of the present invention provides a base station, including a configuration unit, configured to obtain a first frequency hopping parameter set of UE in N sub-bands, where there is a mapping relationship between the N sub-bands and a frequency hopping pattern that is indicated by the first frequency hopping parameter set, the sub-band is a length of consecutive frequency domain resources in a system bandwidth, and $N \geq 1$, and a sending unit, configured to send first configuration information to the UE, where the first configuration information includes sub-band identifiers of the N sub-bands and the first frequency hopping parameter set.

With reference to the third aspect, in a first possible implementation of the third aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where $Z \geq Y \geq X > 0$.

With reference to the first possible implementation of the third aspect, in a second possible implementation of the third aspect, the configuration unit is further configured to generate second configuration information according to the N sub-bands, where the second configuration information includes sub-band identifiers of M sub-bands, any one of the M sub-bands is used to transfer at least one of unicast data between the UE and the base station, a downlink control channel for scheduling the unicast data, an uplink control channel for scheduling the unicast data, or a physical random access channel for scheduling the unicast data, the M sub-bands are any subset of the N sub-bands, and $1 \leq M \leq N$, and the sending unit is further configured to send the second configuration information to the UE, where the second configuration information further includes a second frequency hopping parameter set, there is a mapping relationship between the M sub-bands and a frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the third aspect, in a third possible implementation of the third aspect, the sending unit is further configured to send third configuration information to the UE, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, the H sub-bands are used to transfer at least one of the following: unicast data between the base station and the UE, a downlink control channel for scheduling the unicast data, an uplink control channel for scheduling the unicast data, or a physical random access channel for scheduling the unicast data, and $N \geq H \geq 1$, and the third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

With reference to the first possible implementation of the third aspect, in a fourth possible implementation of the third aspect, the sending unit is further configured to send fourth configuration information to the UE, where the fourth configuration information carries sub-band identifiers of K sub-bands, at least one of the K sub-bands does not belong to the N sub-bands, the K sub-bands are used to transfer at least one of the following: unicast data between the base station and the UE, a downlink control channel for scheduling the unicast data, an uplink control channel for scheduling the unicast data, or a physical random access channel for scheduling the unicast data, and $K \geq 1$, and the fourth configuration information further includes a fourth frequency hopping parameter set, there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first possible implementation of the third aspect, in a fifth possible implementation of the third aspect, the sub-bands are used by the UE to receive a downlink control channel, where downlink control information carried in the downlink control channel carries sub-band identifiers of L sub-bands of a data channel associated with the downlink control channel, the L sub-bands are any sub-bands in the system bandwidth, and 1≤L, and the downlink control information carried in the downlink control channel further carries a fifth frequency hopping parameter set, there is a mapping relationship between the L sub-bands and a frequency hopping pattern that is indicated by the fifth frequency hopping parameter set, and the fifth frequency hopping parameter set is determined by at least one of the following: the sub-band identifiers of the L sub-bands, a quantity L of the sub-bands, or the value of the frequency hopping parameter.

With reference to the first to the fifth possible implementations of the third aspect, in a sixth possible implementation of the third aspect, the sending unit is specifically configured to send the first configuration information to the UE according to a sixth frequency hopping parameter set, where there is a mapping relationship between W sub-bands and a frequency hopping pattern that is indicated by the sixth frequency hopping parameter set, the W sub-bands are pre-stored on the base station, or carried in a master information block (MIB), and W≥1, and the sixth frequency hopping parameter set is determined by at least one of the following: sub-band identifiers of the W sub-bands, a quantity W of the sub-bands, or the value of the frequency hopping parameter.

According to a fourth aspect, an embodiment of the present invention provides user equipment UE, including a receiving unit, configured to receive first configuration information sent by a base station, where the first configuration information includes sub-band identifiers of N sub-bands and a first frequency hopping parameter set in the N sub-bands, there is a mapping relationship between the N sub-bands and a frequency hopping pattern that is indicated by the first frequency hopping parameter set, the sub-band is a length of consecutive frequency domain resources in a system bandwidth, and N≥1, and a determining unit, configured to determine, according to the sub-band identifiers of the N sub-bands and the first frequency hopping parameter set, a frequency domain resource used for communication with the base station.

With reference to the fourth aspect, in a first possible implementation of the fourth aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where Z≥Y≥X>0.

With reference to the first possible implementation of the fourth aspect, in a second possible implementation of the fourth aspect, the receiving unit is further configured to receive second configuration information sent by the base station, where the second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data, the M sub-bands are any subset of the N sub-bands, and 1≤M≤N, and the determining unit is further configured to determine, according to the second configuration information, a frequency domain resource used to send, to the base station, at least one of the following: the unicast data, the downlink control channel for scheduling the unicast data, the uplink control channel for scheduling the unicast data, or the physical random access channel for scheduling the unicast data, where the unicast data carries a cyclic redundancy check CRC bit scrambled by using a specified radio network temporary identifier RNTI of the UE, and a transport block TB of the UE, and the second configuration information further includes a second frequency hopping parameter set, there is a mapping relationship between the M sub-bands and a second frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the fourth aspect, in a third possible implementation of the fourth aspect, the receiving unit is further configured to receive third configuration information sent by the base station, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, N≥H≥1, and the third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter, and the determining unit is further configured to determine, according to the third frequency hopping parameter set, a frequency domain resource used for communication with the base station in the consecutive subframe time Y in which a frequency domain location does not change.

With reference to the first possible implementation of the fourth aspect, in a fourth possible implementation of the fourth aspect, the receiving unit is further configured to receive fourth configuration information sent by the base station, where the fourth configuration information carries sub-band identifiers of K sub-bands, at least one of the K sub-bands does not belong to the N sub-bands, and K≥1, and the determining unit is further configured to determine, according to the fourth configuration information, a frequency domain resource used to transfer at least one of the following to the base station: unicast data, a downlink control channel for scheduling the unicast data, an uplink control channel for scheduling the unicast data, or a physical random access channel for scheduling the unicast data, where the fourth configuration information further includes a fourth frequency hopping parameter set, there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first to the fourth possible implementations of the fourth aspect, in a fifth possible implementation of the fourth aspect, the receiving unit is further configured to obtain, from the downlink control channel, sub-band identifiers of L sub-bands of a data channel associated with the downlink control channel, where the L sub-bands are any sub-bands in the system bandwidth, and 1≤L; obtain the fifth frequency hopping parameter set from the downlink control channel, or obtain the fifth frequency hopping parameter set from the first configuration information, the second configuration information, the third configuration information, or the fourth configuration information, where there is a mapping relationship between the L sub-bands and a frequency hopping pattern that is indicated by the fifth frequency hopping parameter set, and the fifth frequency hopping parameter set is determined by a value/values of one or more of the frequency hopping parameters.

With reference to the first possible implementation of the fourth aspect, in a sixth possible implementation of the fourth aspect, the determining unit is further configured to: if the sub-band identifiers of the L sub-bands are the same as sub-band identifiers of the downlink control channel, determine that a sub-band of the data channel is the same as a sub-band of the downlink control channel; or if the sub-band identifiers of the L sub-bands are different from sub-band identifiers of the downlink control channel, determine a sub-band of the data channel according to the fifth frequency hopping parameter set.

According to a fifth aspect, an embodiment of the present invention provides a base station, including a processor and a transceiver connected to the processor, where the processor is configured to obtain a first frequency hopping parameter set of UE in N sub-bands, where there is a mapping relationship between the N sub-bands and a frequency hopping pattern that is indicated by the first frequency hopping parameter set, the sub-band is a length of consecutive frequency domain resources in a system bandwidth, and N≥1, and the transceiver is configured to send first configuration information to the UE, where the first configuration information includes sub-band identifiers of the N sub-bands and the first frequency hopping parameter set.

With reference to the fifth aspect, in a first possible implementation of the fifth aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where Z≥Y≥X>0.

With reference to the first possible implementation of the fifth aspect, in a second possible implementation of the fifth aspect, the processor is further configured to generate second configuration information according to the N sub-bands, where the second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data, the M sub-bands are any subset of the N sub-bands, and 1≤M≤N, and the transceiver is further configured to send the second configuration information to the UE, where the second configuration information further includes a second frequency hopping parameter set, there is a mapping relationship between the M sub-bands and a frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the fifth aspect, in a third possible implementation of the fifth aspect, the transceiver is further configured to send third configuration information to the UE, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, the H sub-bands are used to transfer at least one of the following: unicast data between the base station and the UE, a downlink control channel for scheduling the unicast data, an uplink control channel for scheduling the unicast data, or a physical random access channel for scheduling the unicast data, and N≥H≥1, and the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter.

With reference to the first possible implementation of the fifth aspect, in a fourth possible implementation of the fifth aspect, the transceiver is further configured to send fourth configuration information to the UE, where the fourth configuration information carries sub-band identifiers of K sub-bands, at least one of the K sub-bands does not belong to the N sub-bands, the K sub-bands are used to transfer at least one of the following: unicast data between the base station and the UE, a downlink control channel for scheduling the unicast data, an uplink control channel for scheduling the unicast data, or a physical random access channel for scheduling the unicast data, and K≥1, and the fourth configuration information further includes a fourth frequency hopping parameter set, there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first to the fourth possible implementations of the fifth aspect, in a fifth possible implementation of the fifth aspect, the sub-bands are used by the UE to receive a downlink control channel, and downlink control information carried in the downlink control channel carries sub-band identifiers of L sub-bands of a data channel associated with the downlink control channel, the L sub-bands are any sub-bands in the system bandwidth, and 1≤L, and the downlink control information carried in the downlink control channel further carries a fifth frequency hopping parameter set, there is a mapping relationship between the L sub-bands and a frequency hopping pattern that is indicated by the fifth frequency hopping parameter set, and the fifth frequency hopping parameter set is determined by at least one of the following: the sub-band identifiers of the L sub-bands, a quantity L of the sub-bands, or the value of the frequency hopping parameter.

With reference to the fifth possible implementation of the fifth aspect, in a sixth possible implementation of the fifth aspect, the transceiver is further configured to send the first configuration information to the UE according to a sixth frequency hopping parameter set, where there is a mapping relationship between W sub-bands and a frequency hopping pattern that is indicated by the sixth frequency hopping parameter set, the W sub-bands are pre-stored on the base station, or carried in a master information block (MIB), and W≥1, and the sixth frequency hopping parameter set is determined by at least one of the following: sub-band identifiers of the W sub-bands, a quantity W of the sub-bands, or the value of the frequency hopping parameter.

According to a sixth aspect, an embodiment of the present invention provides user equipment UE, including a processor and a transceiver connected to the processor, where the transceiver is configured to receive first configuration information sent by a base station, where the first configuration information includes sub-band identifiers of N sub-bands and a first frequency hopping parameter set in the N sub-bands, there is a mapping relationship between the N sub-bands and a frequency hopping pattern that is indicated by the first frequency hopping parameter set, the sub-band is a length of consecutive frequency domain resources in a system bandwidth, and N≥1, and the processor is configured to determine, according to the sub-band identifiers of the N sub-bands and the first frequency hopping parameter set, a frequency domain resource used for communication with the base station.

With reference to the sixth aspect, in a first possible implementation of the sixth aspect, the first frequency hopping parameter set is determined by at least one of the following: the sub-band identifiers of the N sub-bands, a quantity N of the sub-bands, or a value of a frequency hopping parameter, and the frequency hopping parameter includes one or more of the following: a system frame number, a system subframe number, a system frame number and a system subframe number that are used to send a physical broadcast channel PBCH, a system frame number and a system subframe number that are used to send a synchronization signal, a frame structure of a frequency division duplex system or that of a time division duplex system, a sub-band bandwidth of the sub-band, a consecutive subframe time X for joint channel estimation, a consecutive subframe time Y in which a frequency domain location does not change, a subframe time Z for sending a same transport block, a timing interval between a downlink control channel and a downlink shared channel, a timing interval between a downlink control channel and an uplink shared channel, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, where Z≥Y≥X>0.

With reference to the first possible implementation of the sixth aspect, in a second possible implementation of the sixth aspect, the transceiver is further configured to receive second configuration information sent by the base station, where the second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data, the M sub-bands are any subset of the N sub-bands, and 1≤M≤N, and the processor is further configured to determine, according to the second configuration information, a frequency domain resource used to send, to the base station, at least one of the following: the unicast data, the downlink control channel for scheduling the unicast data, the uplink control channel for scheduling the unicast data, or the physical random access channel for scheduling the unicast data, where the unicast data carries a cyclic redundancy check CRC bit scrambled by using a specified radio network temporary identifier RNTI of the UE, and a transport block TB of the UE, and the second configuration information further includes a second frequency hopping parameter set, there is a mapping relationship between the M sub-bands and a second frequency hopping pattern that is indicated by the second frequency hopping parameter set, and the second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

With reference to the first possible implementation of the sixth aspect, in a third possible implementation of the sixth aspect, the transceiver is further configured to receive third configuration information sent by the base station, where the third configuration information includes a third frequency hopping parameter set, there is a mapping relationship between H sub-bands and a frequency hopping pattern that is indicated by the third frequency hopping parameter set in the consecutive subframe time Y in which a frequency domain location does not change, the H sub-bands are any subset of the N sub-bands, N≥H≥1, and the third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter, and the processor is further configured to determine, according to the third frequency hopping parameter set, a frequency domain resource used for communication with the base station in the consecutive subframe time Y in which a frequency domain location does not change.

With reference to the first possible implementation of the sixth aspect, in a fourth possible implementation of the sixth aspect, the transceiver is further configured to receive fourth configuration information sent by the base station, where the fourth configuration information carries sub-band identifiers of K sub-bands, at least one of the K sub-bands does not belong to the N sub-bands, and K≥1, and the processor is further configured to determine, according to the fourth configuration information, a frequency domain resource used to transfer at least one of the following to the base station: the unicast data, the downlink control channel for scheduling the unicast data, the uplink control channel for scheduling the unicast data, or the physical random access channel for scheduling the unicast data, where the fourth configuration information further includes a fourth frequency hopping parameter set, there is a mapping relationship between the K sub-bands and a frequency hopping pattern that is indicated by the fourth frequency hopping parameter set, and the fourth frequency hopping parameter set is determined by at least one of the following: the sub-band identifiers of the K sub-bands, a quantity K of the sub-bands, or the value of the frequency hopping parameter.

With reference to the first to the fourth possible implementations of the sixth aspect, in a fifth possible implementation of the sixth aspect, the transceiver is further configured to obtain, from the downlink control channel, sub-band identifiers of L sub-bands of a data channel associated with the downlink control channel, where the L sub-bands are any sub-bands in the system bandwidth, and 1≤L; obtain the fifth frequency hopping parameter set from the downlink control channel, or obtain the fifth frequency hopping parameter set from the first configuration information, the second configuration information, the third configuration information, or the fourth configuration information, where there is a mapping relationship between the L sub-bands and a frequency hopping pattern that is indicated by the fifth frequency hopping parameter set, and the fifth frequency hopping parameter set is determined by a value/values of one or more of the frequency hopping parameters.

With reference to the fifth possible implementation of the sixth aspect, in a sixth possible implementation of the sixth aspect, the processor is further configured to: if the sub-band identifiers of the L sub-bands are the same as sub-band identifiers of the downlink control channel, determine that a sub-band of the data channel is the same as a sub-band of the downlink control channel, or if the sub-band identifiers of the L sub-bands are different from sub-band identifiers of the downlink control channel, determine a sub-band of the data channel according to the fifth frequency hopping parameter set.

The embodiments of the present invention provide a frequency domain resource configuration method and apparatus. A base station first obtains a first frequency hopping parameter set of UE in N sub-bands. There is a mapping relationship between the N sub-bands and a frequency hopping pattern that is indicated by the first frequency hopping parameter set, that is, a frequency domain location of the N sub-bands configured by the base station for the UE changes in different time periods. Therefore, after the base station sends, to the UE, first configuration information that carries sub-band identifiers of the N sub-bands and the first frequency hopping parameter set, the UE may determine, according to the first configuration information, frequency domain resources used for communication with the base station at different moments. In this way, compared with the prior art in which the UE can use only one or more fixed frequency bands to communicate with the base station, in this solution, both quality of communication between the UE and the base station and resource utilization of each sub-band in a system bandwidth can be improved by using a frequency domain diversity gain.

BRIEF DESCRIPTION OF THE DRAWINGS

To describe the technical solutions in the embodiments of the present invention more clearly, the following briefly describes the accompanying drawings required for describing the embodiments or the prior art.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In description of the present invention, "multiple" means two or more than two, unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
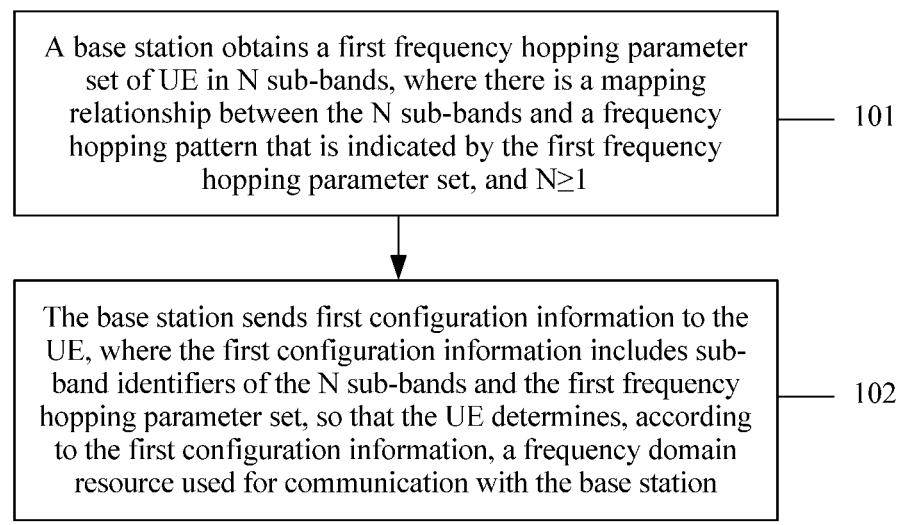
FIG. 1 is a schematic flowchart 1 of a frequency domain resource configuration method according to an embodiment of the present invention.

This embodiment of the present invention provides a frequency domain resource configuration method. As shown in FIG. 1, the method includes the following steps.

101. A base station obtains a first frequency hopping parameter set of UE in N sub-bands, where there is a mapping relationship between the N sub-bands and a frequency hopping pattern that is indicated by the first frequency hopping parameter set, and N≥1.

The sub-band involved in this embodiment of the present invention is a length of consecutive frequency domain resources in a system bandwidth.

Specifically, to improve a frequency domain diversity gain in communication between the base station and the UE, the base station may obtain the first frequency hopping parameter set when configuring the N sub-bands for the UE, so that frequency hopping is performed on the N sub-bands in different time periods. In this way, a frequency domain resource available to the UE is on different sub-bands in the different time periods.

There is a mapping relationship between the N sub-bands and the frequency hopping pattern that is indicated by the first frequency hopping parameter set. In this way, the UE may determine frequency hopping patterns of the N sub-bands according to the first frequency hopping parameter set, determine sub-bands configured by the base station for the UE at different moments, and then determine frequency domain resources used in interaction with the base station at the moments.

Optionally, the first frequency hopping parameter set is determined by at least one of the following: the sub-band identifiers of the N sub-bands, a quantity N of the sub-bands, or a value of a frequency hopping parameter. Specifically, the frequency hopping parameter includes one or more of the following: a system frame number, a subframe number, a system frame number and a system subframe number that are used to send a PBCH (physical broadcast channel), a system frame number and a system subframe number that are used to send a synchronization signal, a frame structure of a frequency division duplex system or that of a time division duplex system, a bandwidth of the sub-band, a consecutive subframe time X for joint channel estimation, a consecutive subframe time Y in which a frequency domain location does not change, a subframe time Z for sending a same transport block, an identifier of the UE, a cell identity, the system bandwidth, an uplink/downlink subframe ratio of a TDD (time division duplex) system, a special subframe configuration of a TDD system, and a subframe configuration of an MBSFN (multimedia broadcast multicast service single frequency network), and Z≥Y≥X>0.

It should be noted that there may be a correspondence between X, Y, and Z. For example, Y may be obtained by means of calculation according to Z and the sub-band quantity N, and X and Y may be considered to be equal by default. Further, because different areas may have different coverage enhancement requirements, Z may be set in a piecewise function manner, to satisfy the different coverage enhancement requirements of the different areas. For example, $Z$ may be set to $\begin{cases} = 10, \text{ Coverage enhancement level 1} \\ = 20, \text{ Coverage enhancement level 2} \\ = 30, \text{ Coverage enhancement level 3} \end{cases}$, and each value of $Z$ may correspond to a value of $Y$ or $X$.

102. The base station sends first configuration information to the UE, where the first configuration information includes sub-band identifiers of the N sub-bands and the first frequency hopping parameter set, so that the UE determines, according to the first configuration information, a frequency domain resource used for communication with the base station.

Specifically, after obtaining the first frequency hopping parameter set of the UE in the N sub-bands, the base station generates the first configuration information that carries the sub-band identifiers of the N sub-bands and the first frequency hopping parameter set, and sends the first configuration information to the UE by using first SI (system information) or RRC (radio resource control) signaling, so that the UE determines, according to the first configuration information, the frequency domain resource used for communication with the base station.

Certainly, the base station may further select M sub-bands from the N sub-bands and configure the UE, so that the UE further determines the M sub-bands from the N sub-bands for communication with the base station. The method is described in detail in a subsequent embodiment, and therefore details are not described herein.

Figure 2:
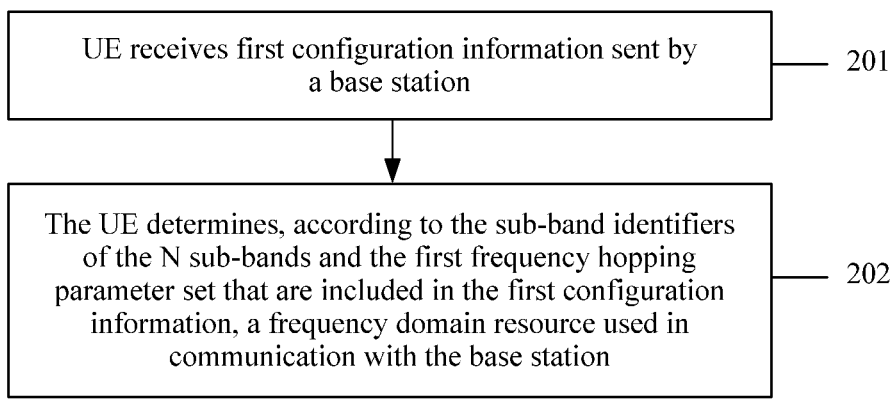
FIG. 2 is a schematic flowchart 2 of a frequency domain resource configuration method according to an embodiment of the present invention.

An embodiment of the present invention provides a frequency domain resource configuration method. As shown in FIG. 2, the method includes the following steps.

201. UE receives first configuration information sent by a base station.

Specifically, after steps 101 and 102, the UE may further receive, by using first SI or RRC signaling, the first configuration information sent by the base station. The first configuration information includes sub-band identifiers of N sub-bands and a first frequency hopping parameter set in the N sub-bands. There is a mapping relationship between the N sub-bands and a frequency hopping pattern that is indicated by the first frequency hopping parameter set.

202. The UE determines, according to sub-band identifiers of the N sub-bands and the first frequency hopping parameter set that are included in the first configuration information, a frequency domain resource used for communication with the base station.

Specifically, the UE determines, according to the sub-band identifiers of the N sub-bands in the first configuration information, a sub-band that can be used by the UE to send an uplink control channel and/or an uplink shared channel and/or a physical random access channel to the base station or to receive a downlink control channel and/or a downlink shared channel. In addition, because there is a mapping relationship between the N sub-bands and the frequency hopping pattern that is indicated by the first frequency hopping parameter set, the UE may further determine, according to the first frequency hopping parameter set in the first configuration information, frequency domain locations of the N sub-bands specifically used at different moments.

This embodiment of the present invention provides a frequency domain resource configuration method. A base station first obtains a first frequency hopping parameter set of UE in N sub-bands. There is a mapping relationship between the N sub-bands and a frequency hopping pattern that is indicated by the first frequency hopping parameter set, that is, a frequency domain location of the N sub-bands configured by the base station for the UE changes in different time periods. Therefore, after the base station sends, to the UE, first configuration information that carries sub-band identifiers of the N sub-bands and the first frequency hopping parameter set, the UE may determine, according to the first configuration information, frequency domain resources used for communication with the base station at different moments. In this way, compared with the prior art in which the UE can use only one or more fixed frequency bands to communicate with the base station, in this solution, both quality of communication between the UE and the base station and resource utilization of each sub-band in a system bandwidth can be improved by using a frequency domain diversity gain.

Embodiment 2

Figure 3:
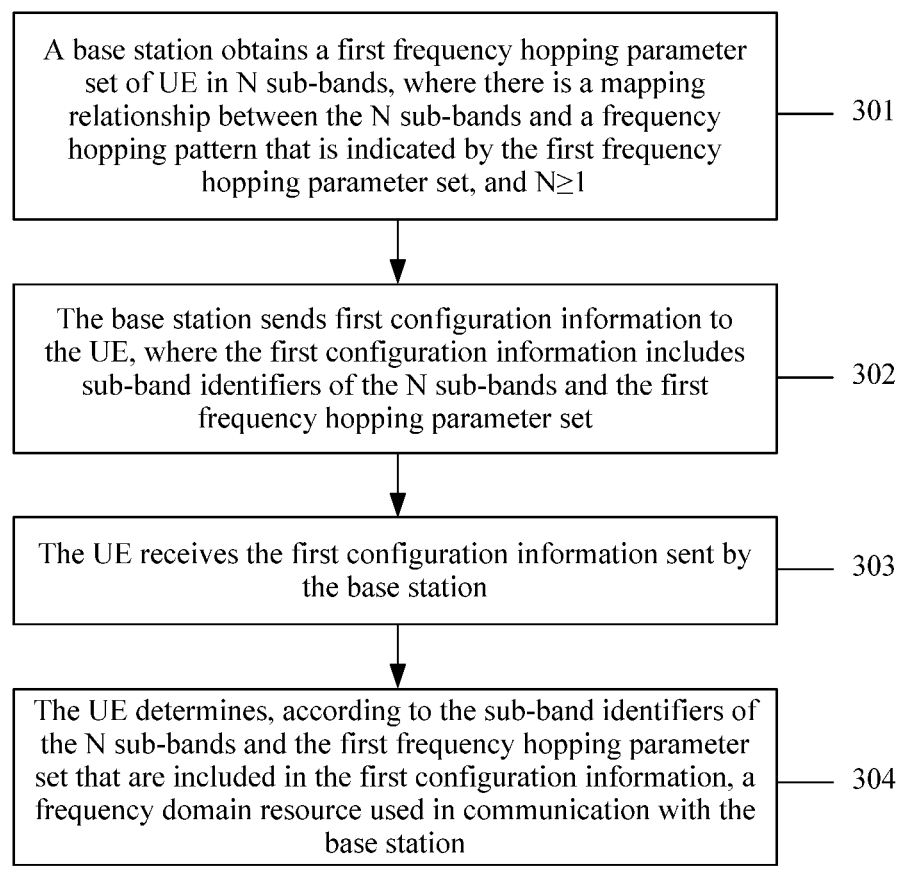
FIG. 3 is a schematic flowchart 3 of a frequency domain resource configuration method according to an embodiment of the present invention.

An embodiment of the present invention provides a frequency domain resource configuration method. As shown in FIG. 3, the method includes the following steps:

301. A base station obtains a first frequency hopping parameter set of UE in N sub-bands, where there is a mapping relationship between the N sub-bands and a frequency hopping pattern that is indicated by the first frequency hopping parameter set, and $N \geq 1$.

302. The base station sends first configuration information to the UE, where the first configuration information includes sub-band identifiers of the N sub-bands and the first frequency hopping parameter set.

303. The UE receives the first configuration information sent by the base station.

304. The UE determines, according to the sub-band identifiers of the N sub-bands and the first frequency hopping parameter set that are included in the first configuration information, a frequency domain resource used for communication with the base station.

Before the base station communicates with the UE, the base station needs to configure the UE by using the N sub-bands. The N sub-bands may include a downlink sub-band used to transmit a downlink control channel and/or a downlink shared channel, or the N sub-bands may be uplink sub-bands used to transmit an uplink control channel and/or an uplink shared channel and/or a physical random access channel. If both the uplink sub-band and the downlink sub-band are included, an identifier of the uplink sub-band may be the same as, partially the same as, or different from an identifier of the downlink sub-band. In this way, the UE may receive, on the downlink sub-band configured by the base station, the downlink control channel and/or the downlink shared channel sent by the base station, or send, on the uplink sub-band configured by the base station, the uplink control channel and/or the uplink shared channel and/or the physical random access channel to the base station.

Specifically, in step 301, the base station may first determine the N sub-bands (the sub-band is a length of consecutive frequency domain resources in a system bandwidth, and is not described in detail in a subsequent embodiment) available to the UE. A mapping relationship between a sub-band identifier and a frequency domain resource indicated by the sub-band identifier is pre-stored on the base station. Then, the base station may configure the first frequency hopping parameter set for the N sub-bands, so that frequency domain resources available to the UE in different time periods are on different sub-bands. In this way, quality of communication between the UE and the base station is improved by implementing a frequency domain diversity gain.

The first frequency hopping parameter set is determined by at least one of the following: the sub-band identifiers of the N sub-bands, a quantity N of the sub-bands, or a value of a frequency hopping parameter. Specifically, the frequency hopping parameter includes: a system frame number, a subframe number, a system frame number and a system subframe number that are used to send a PBCH, a system frame number and a system subframe number that are used to send a synchronization signal, a frame structure of a frequency division duplex system or that of a time division duplex system, a bandwidth of the sub-band, a consecutive subframe time X for joint channel estimation, a consecutive subframe time Y in which a frequency domain location does not change, a subframe time Z for sending a same transport block, an identifier of the UE, a cell identity, the system bandwidth, an uplink/downlink subframe ratio of a time division duplex TDD system, a special subframe configuration of a TDD system, and a subframe configuration of a Multimedia Broadcast multicast service Single Frequency Network MBSFN, and $Z \geq Y \geq X > 0$.

There may be a correspondence between X, Y, and Z. For example, Y may be obtained by means of calculation according to Z and the sub-band quantity N, and X and Y may be considered to be equal by default. Further, because different areas may have different coverage enhancement requirements, Z may be set in a piecewise function manner, to satisfy the different coverage enhancement requirements of the different areas.

Figure 4:
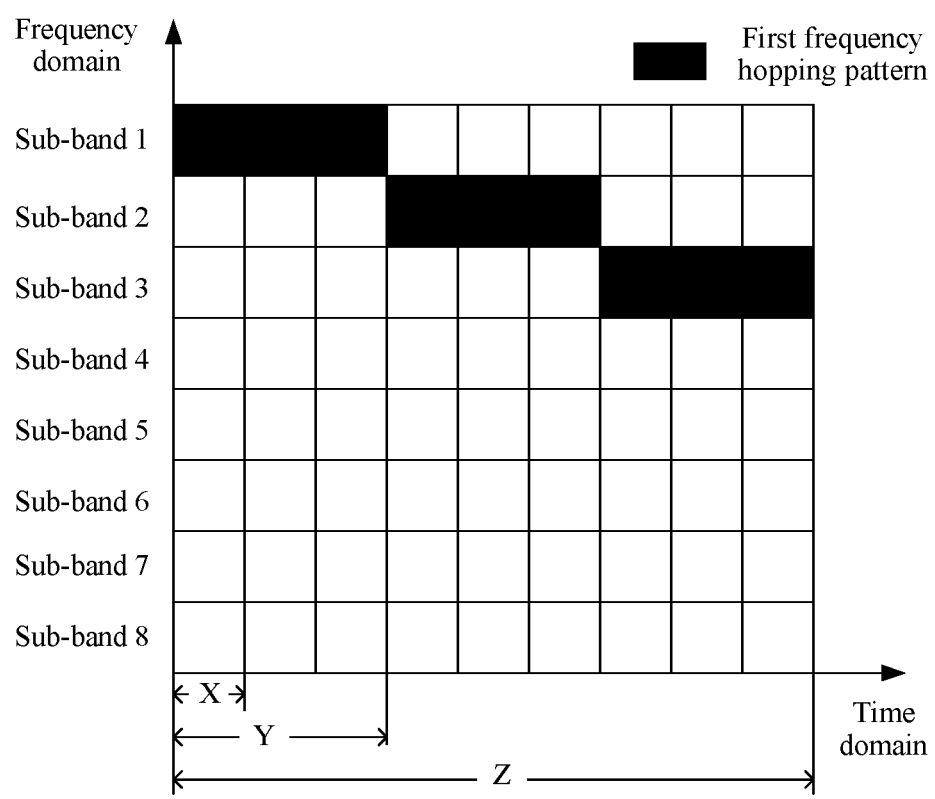
FIG. 4 is a schematic diagram 1 of a frequency hopping pattern according to an embodiment of the present invention.

For example, as shown in FIG. 4, FIG. 4 is a frequency hopping pattern (for example, a first frequency hopping pattern) indicated by the first frequency hopping parameter set. The system bandwidth includes eight sub-bands. The base station determines that the UE can use one sub-band, the consecutive subframe time for joint channel estimation is X, a location of the sub-band does not change in a time Y, and the subframe time for sending a same transport block is Z. X may be equal to Y, and Y may be a transmission time of a radio frame. In this way, in the time Z for sending a same transport block, frequency hopping is performed for Z/Y times totally.

Optionally, in the frequency hopping pattern that is indicated by the first frequency hopping parameter set, a sub-band starting with a radio frame whose SFN (system frame number) mod=0 is in a system bandwidth center. A location of the sub-band moves from the system bandwidth center for a sub-band every the time Y in a system bandwidth frequency increasing direction. In a next time Y, the location of the sub-band moves from the system bandwidth center for a sub-band in a system bandwidth frequency decreasing direction. Alternatively, a sub-band starting with a radio frame whose SFN mod=0 is on a side with a minimum system bandwidth frequency, and a location of the sub-band moves from one side of the system bandwidth to the other side of a system bandwidth by means of frequency hopping every time Y. This is not limited in the present invention.

Figure 5:
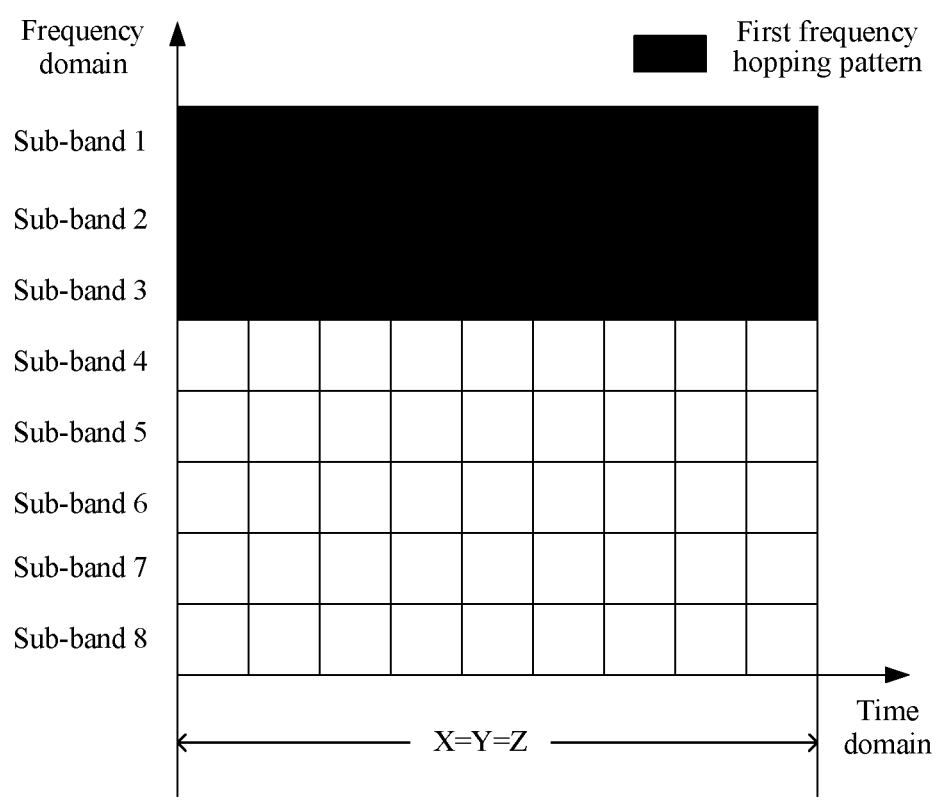
FIG. 5 is a schematic diagram 2 of a frequency hopping pattern according to an embodiment of the present invention.

Alternatively, as a special example of frequency hopping, the base station determines that frequency hopping may not be performed on the N sub-bands available to the UE. In this case, as shown in FIG. 5, in a first frequency hopping pattern, all sub-bands 1 to 3 are sub-bands available to the UE. Further, the base station may further generate second configuration information used to transfer, to the UE, unicast data and/or a downlink control channel and/or an uplink control channel and/or a physical random access channel for scheduling the unicast data, and send the second configuration information to the UE. The second configuration information includes sub-band identifiers of M sub-bands. Any one of the M sub-bands is used to transfer, between the UE and the base station, the unicast data and/or the downlink control channel and/or the uplink control channel and/or the physical random access channel for scheduling the unicast data, and M is (1≤M≤N). The M sub-bands may be any subset of the N sub-bands configured by the base station. In this way, the UE may further determine, according to the second configuration information, one of the M sub-bands that is used to transfer, to the base station, unicast data and/or a downlink control channel and/or an uplink control channel and/or a physical random access channel for scheduling the unicast data.

The unicast data carries a CRC (cyclic redundancy check) bit scrambled by using a specified RNTI (radio network temporary identifier) of the UE, and a transport block TB of the UE.

Figure 6:
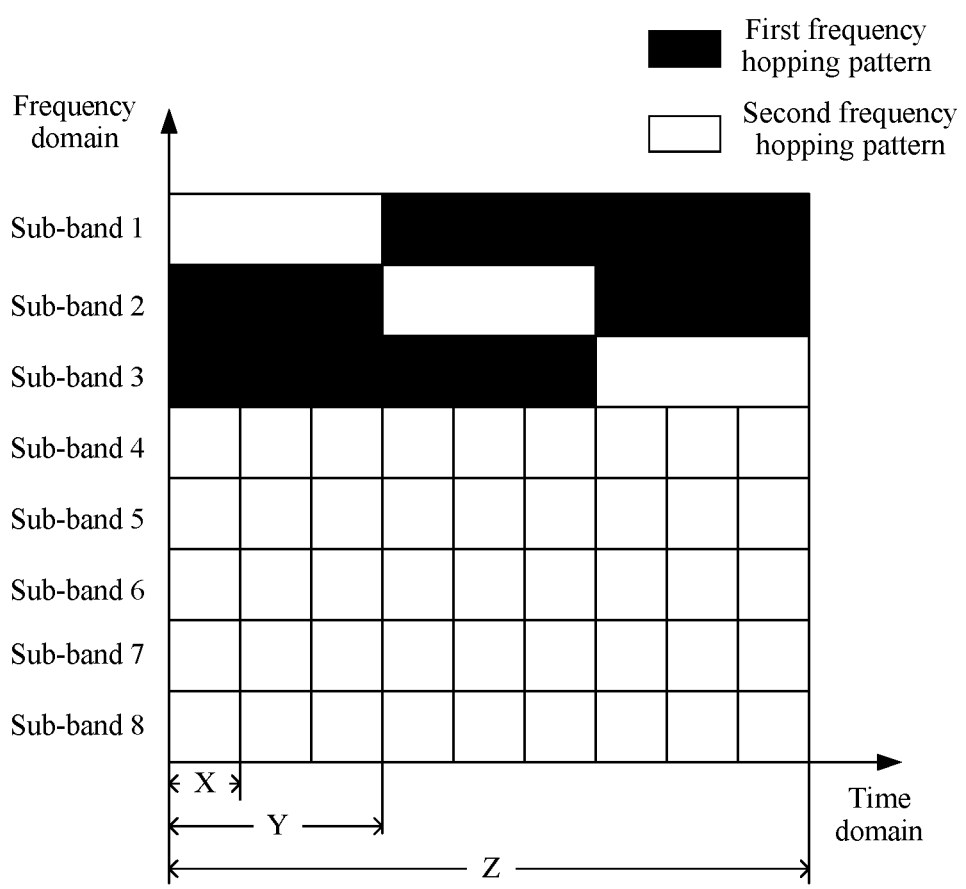
FIG. 6 is a schematic diagram 3 of a frequency hopping pattern according to an embodiment of the present invention.

Further, the second configuration information further includes a second frequency hopping parameter set. In this case, there is a mapping relationship between the M sub-bands and a frequency hopping pattern that is indicated by the second frequency hopping parameter set, that is, frequency hopping is performed on a sub-band used for communication between the base station and the UE in the M sub-bands. As shown in FIG. 6, FIG. 6 is the frequency hopping pattern (for example, a second frequency hopping pattern) indicated by the second frequency hopping parameter set. The second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter. That is, the second frequency hopping parameter set may be the same as the first frequency hopping parameter set, partially the same as the first frequency hopping parameter set, or different from the first frequency hopping parameter set. In this way, based on the first frequency hopping parameter set, with reference to the second frequency hopping parameter set, the UE may determine sub-bands used to transmit, at different moments, the unicast data and/or the downlink control channel and/or the uplink control channel and/or the physical random access channel for scheduling the unicast data.

Figure 7:
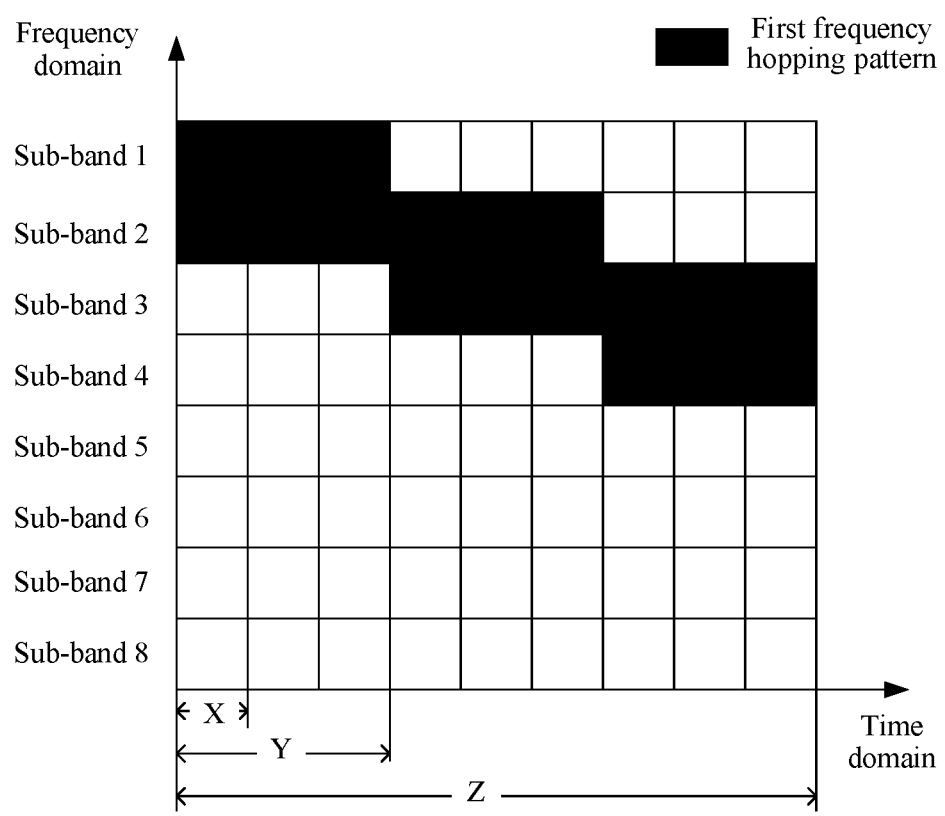
FIG. 7 is a schematic diagram 4 of a frequency hopping pattern according to an embodiment of the present invention.

Alternatively, as shown in FIG. 7, the base station determines that the UE can use more than one sub-band. In addition, frequency hopping may still be performed on the N sub-bands according to the first frequency hopping pattern that is indicated by the first frequency hopping parameter set.

Figure 8:
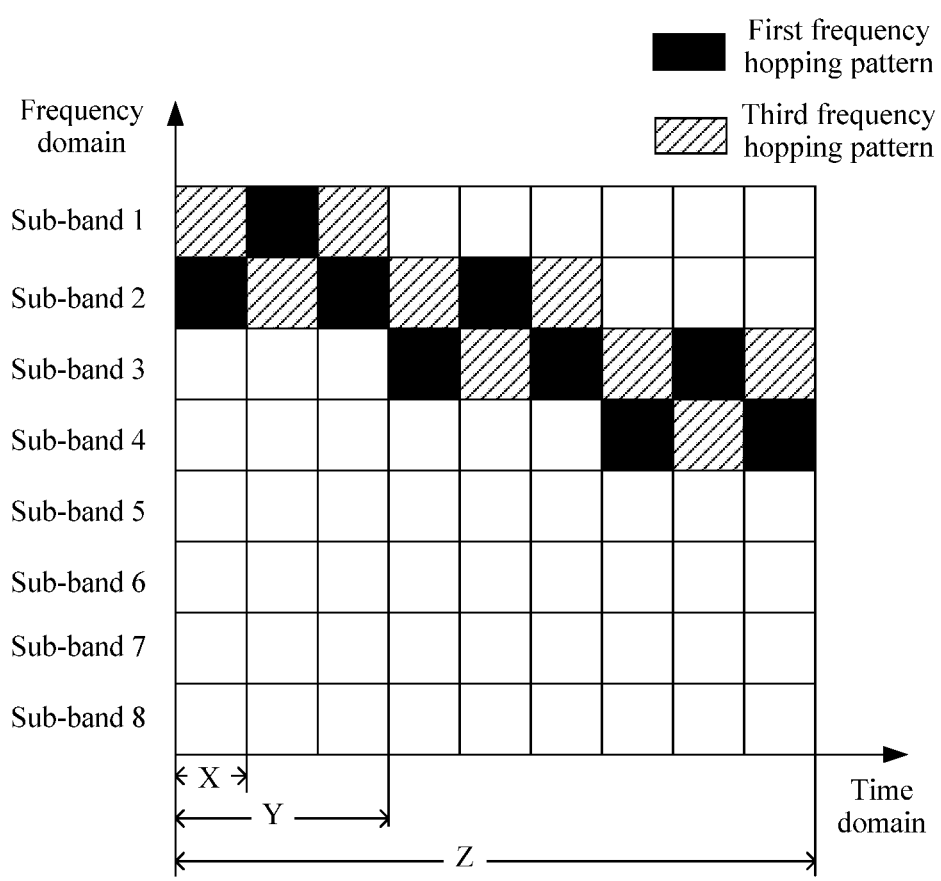
FIG. 8 is a schematic diagram 5 of a frequency hopping pattern according to an embodiment of the present invention.

In this case, the base station may further send third configuration information to the UE. The third configuration information includes a third frequency hopping parameter set. There is a mapping relationship between H sub-bands and a frequency hopping pattern that is indicated by the third frequency hopping parameter set in the time Y. The H sub-bands are any subset of the N sub-bands. In this case, the quantity N is greater than 1. For example, FIG. 8 shows the frequency hopping pattern (a third frequency hopping pattern) indicated by the third frequency hopping parameter set. It may be learned that the UE may determine, according to the third frequency hopping parameter set, a frequency domain resource used for communication with the base station in the consecutive subframe time Y in which a frequency domain location does not change, that is, frequency hopping is performed in the consecutive subframe time Y in which a frequency domain location does not change. Similar to the second frequency hopping parameter set, the third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

In addition, when the N sub-bands in the first configuration information configured by the base station for the UE are specifically used to transmit a public message, the base station may further configure K sub-bands for the UE that are used to transmit the unicast data and/or the downlink control channel and/or the uplink control channel and/or the physical random access channel for scheduling the unicast data. That is, after step 101 is performed, the base station may further send fourth configuration information to the UE. The fourth configuration information carries sub-band identifiers of the K (K≥1) sub-bands, so that the UE determines, according to the sub-band identifiers of the K sub-bands, a sub-band used to transfer, to the base station, unicast data and/or a downlink control channel and/or an uplink control channel and/or a physical random access channel for scheduling the unicast data. However, at least one of the K sub-bands does not belong to the N sub-bands. This is different from the second configuration information.

Figure 9:
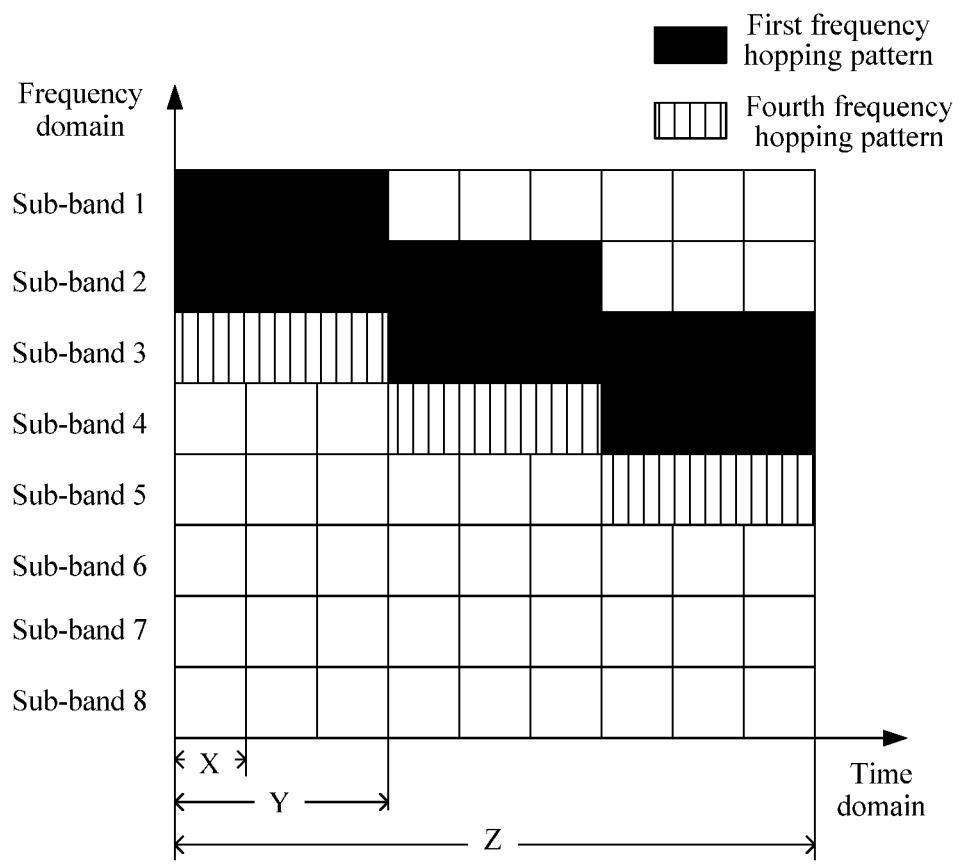
FIG. 9 is a schematic diagram 6 of a frequency hopping pattern according to an embodiment of the present invention.

Similar to the second configuration information, the fourth configuration information further includes a fourth frequency hopping parameter set. In this case, there is a mapping relationship between the K sub-bands and a frequency hopping pattern that is indicated by the fourth frequency hopping parameter set, that is, frequency hopping is performed on the sub-band of the K sub-bands that is used to transmit, between the base station and the UE, the unicast data and/or the downlink control channel and/or the uplink control channel and/or the physical random access channel for scheduling the unicast data. As shown in FIG. 9, FIG. 9 is the frequency hopping pattern (for example, a fourth frequency hopping pattern) indicated by the fourth frequency hopping parameter set. The fourth frequency hopping parameter set is determined by at least one of the following: the sub-band identifiers of the K sub-bands, a quantity K of the sub-bands, or the value of the frequency hopping parameter. That is, the fourth frequency hopping parameter set may be the same as the first frequency hopping parameter set, partially the same as the first frequency hopping parameter set, or different from the first frequency hopping parameter set. In this way, based on the first frequency hopping parameter set, with reference to the fourth frequency hopping parameter set, the UE may determine sub-bands used to transmit, at different moments, the unicast data and/or the downlink control channel for scheduling the unicast data.

It should be noted that all the sub-bands (for example, the N sub-bands in the first configuration information, the M sub-bands in the second configuration information, the H sub-bands in the third configuration information, or the K sub-bands in the fourth configuration information) involved in this embodiment of the present invention can be used by the UE to receive a downlink control channel, for example, a downlink control channel for scheduling the public message, or the downlink control channel for scheduling the unicast data. In this case, downlink control information carried in the downlink control channel carries sub-band identifiers of L sub-bands of a data channel associated with the downlink control channel, the L sub-bands are any sub-bands in the system bandwidth, and 1≤L.

Specifically, when the N sub-bands configured by the base station for the UE are used by the UE to receive the downlink control channel, if downlink control information carried in the downlink control channel does not include sub-band identifiers of a data channel scheduled by the downlink control channel, in this case, a sub-band of the scheduled data channel is the same as a sub-band of the downlink control channel by default.

Alternatively, if downlink control information carried in the downlink control channel includes sub-band identifiers of L sub-bands of a data channel scheduled by the downlink control channel, the downlink control information carried in the downlink control channel may further carry a fifth frequency hopping parameter set. There is a mapping relationship between the L sub-bands and a frequency hopping pattern that is indicated by the fifth frequency hopping parameter set. Similarly, the fifth frequency hopping parameter set is determined by at least one of the following: the sub-band identifiers of the L sub-bands, a quantity L of the sub-bands, or the value of the frequency hopping parameter. In this way, after receiving the downlink control information carried in the downlink control channel, the UE may determine the sub-bands of the scheduled data channel according to the fifth frequency hopping parameter set.

Alternatively, when a sub-band for transmitting the downlink control channel is a sub-band of the downlink control channel for scheduling the unicast data, a fifth frequency hopping parameter set may be further carried in the first configuration information, the second configuration information, the third configuration information, or the fourth configuration information, and sent to the UE, so that the UE determines, according to the sub-band identifiers of the L sub-bands and the fifth frequency hopping parameter set, the L sub-bands used by the data channel at different moments.

The data channel is a shared channel that carries data, and includes a PUSCH (physical uplink shared channel) and a PDSCH (physical downlink shared channel). In addition, similar to the second frequency hopping parameter set and the third frequency hopping parameter set, the fourth frequency hopping parameter set is determined by a value/values of one or more of the frequency hopping parameters.

According to the foregoing solution, in the subframe time Z for sending a same transport block, frequency hopping may be performed for multiple times on the N sub-bands configured by the base station for the UE. That is, based on an existing repeatedly sending technology, a frequency hopping technology is combined with the repeatedly sending technology in this solution. Therefore, in multiple subframes for sending a same transport block, a sub-band (that is, a frequency domain resource location) used by the UE is different from a sub-band used by the UE in a former subframe (or former subframes). In this way, both a time domain diversity gain and a frequency domain diversity gain may be obtained. This greatly improves quality of communication between the base station and the UE, and improves coverage performance of the base station.

It should be noted that at least one of a consecutive subframe time X1 for joint channel estimation, a consecutive subframe time Y1 in which a frequency domain location does not change, or a subframe time Z1 for sending a same transport block determines the first frequency hopping parameter set; and may be carried in the first configuration information, may be carried in an MIB (master information block), or may be pre-stored on the base station.

At least one of a consecutive subframe time X2 for joint channel estimation, a consecutive subframe time Y2 in which a frequency domain location does not change, or a subframe time Z2 for sending a same transport block determines the second frequency hopping parameter set; and may be carried in the first configuration information, may be carried in the second configuration information, may be carried in a master information block (MIB), or may be pre-stored on the base station.

At least one of a consecutive subframe time X3 for joint channel estimation, a consecutive subframe time Y3 in which a frequency domain location does not change, or a subframe time Z3 for sending a same transport block determines the third frequency hopping parameter set; and may be carried in the first configuration information, may be carried in the second configuration information, may be carried in the third configuration information, may be carried in a master information block (MIB), or may be pre-stored on the base station.

At least one of a consecutive subframe time X4 for joint channel estimation, a consecutive subframe time Y4 in which a frequency domain location does not change, or a subframe time Z4 for sending a same transport block determines the fourth frequency hopping parameter set; and may be carried in the first configuration information, may be carried in a master information block (MIB), or may be pre-stored on the base station.

At least one of a consecutive subframe time X5 for joint channel estimation, a consecutive subframe time Y5 in which a frequency domain location does not change, or a subframe time Z5 for sending a same transport block determines the fifth frequency hopping parameter set; and may be carried in the first configuration information, may be carried in the second configuration information, may be carried in the third configuration information, may be carried in a master information block (MIB), may be pre-stored on the base station, or may be carried in the downlink control information carried in the downlink control channel.

Further, the N sub-bands configured by the base station for the UE may be used to transfer the unicast data between the base station and the UE and/or the downlink control channel and/or the uplink control channel and/or the physical random access channel for scheduling the unicast data; may be used to transfer the public message, where the public message includes at least one of the following: system information SI, a random access response RAR, and paging information; may be used to transfer the public message and a scheduling parameter for scheduling the public message; and may be further used to transfer the public message and a control channel that carries the scheduling parameter.

If the N sub-bands configured by the base station for the UE are used to transfer the unicast data and the downlink control channel for scheduling the unicast data, and N=1, the sub-band may be used to receive the downlink control channel, and may be further used to receive a downlink shared channel (DSCH) that carries data.

Certainly, the N sub-bands configured by the base station for the UE may be used to transfer the unicast data and/or the downlink control channel and/or the uplink control channel and/or the physical random access channel for scheduling the unicast data, and the public message and/or the scheduling parameter for scheduling the public message and/or a downlink control channel for scheduling the public message. This is not limited in the present invention. However, configuration information needs to indicate one of the N sub-bands that is used to transfer the unicast data and/or the downlink control channel and/or the uplink control channel and/or the physical random access channel for scheduling the unicast data, and one of the N sub-bands that is used to transfer the public message and/or the scheduling parameter for scheduling the public message and/or the downlink control channel for scheduling the public message.

It should be further noted that the base station may send the first configuration information to the UE by using first system information SI or RRC signaling. In addition, the base station may send the second configuration information, the third configuration information, or the fourth configuration information to the UE by using MAC signaling or RRC signaling. The MAC signaling includes a random access response RAR, a re-designed RAR, or a re-defined MAC control element CE. The RRC signaling includes RRC signaling dedicated for the UE, that is, RRC configuration signaling, or RRC re-configuration signaling, or re-defined RRC signaling.

In step 302, the base station sends the first configuration information obtained in step 101 to the UE, and the first configuration information includes the sub-band identifiers of the N sub-bands and the first frequency hopping parameter set, so that the UE determines, according to the first configuration information, the frequency domain resource used for communication with the base station.

Specifically, frequency hopping may be further performed on a sub-band used by the base station to send the first configuration information. In this case, the base station sends the first configuration information to the UE according to a sixth frequency hopping parameter set. Similarly, the sixth frequency hopping parameter set is determined by a value/values of one or more of the frequency hopping parameters. In addition, there is a mapping relationship between W sub-bands and a frequency hopping pattern that is indicated by the sixth frequency hopping parameter set. The W sub-bands are pre-stored on the base station, or carried in a master information block (MIB), and W≥1.

In addition, at least one of a consecutive subframe time X6 for joint channel estimation, a consecutive subframe time Y6 in which a frequency domain location does not change, or a subframe time Z6 for sending a same transport block determines the sixth frequency hopping parameter set; and may be carried in a master information block (MIB), or may be pre-stored on the base station.

In step 303, after the base station sends the first configuration information to the UE by using the first SI or the RRC signaling, the UE obtains the first configuration information by receiving the first SI or the RRC signaling. The first configuration information includes the sub-band identifiers of the N sub-bands configured by the base station for the UE and the first frequency hopping parameter set.

It should be noted that the base station may send the first configuration information to multiple UEs, or the base station sends the first configuration information to designated UE. This is not limited in this embodiment of the present invention.

In step 304, the UE determines, according to the sub-band identifiers of the N sub-bands in the first configuration information, a sub-band that can be used by the UE to send the unicast data and/or the downlink control channel and/or the uplink control channel and/or the physical random access channel for scheduling the unicast data, or the public message and/or the scheduling parameter for scheduling the public message and/or the downlink control channel for scheduling the public message to the base station. In addition, because there is a mapping relationship between the N sub-bands and the frequency hopping pattern that is indicated by the first frequency hopping parameter set, the UE may further determine, according to the first frequency hopping parameter set in the first configuration information, frequency domain locations of the N sub-bands specifically used at different moments.

In addition, all the sub-bands (for example, the N sub-bands in the first configuration information, the M sub-bands in the second configuration information, the H sub-bands in the third configuration information, or the K sub-bands in the fourth configuration information) involved in this embodiment of the present invention can be used by the UE to receive the downlink control channel. The downlink control information carried in the downlink control channel carries the sub-band identifiers of the L sub-bands of the data channel associated with the downlink control channel, the L sub-bands are any sub-bands in the system bandwidth, and 1≤L.

Therefore, the UE may further obtain the fifth frequency hopping parameter set from the downlink control information carried in the downlink control channel, the first configuration information, the second configuration information, the third configuration information, or the fourth configuration information. There is a mapping relationship between the L sub-bands and a frequency hopping pattern that is indicated by the fifth frequency hopping parameter set. Similarly, the fifth frequency hopping parameter set is determined by at least one of the following: the sub-band identifiers of the L sub-bands, the quantity L of the sub-bands, or the value of the frequency hopping parameter.

In this way, after the UE obtains the sub-band identifiers of the L sub-bands of the data channel and the fifth frequency hopping parameter set, if the sub-band identifiers of the L sub-bands are the same as sub-band identifiers of the downlink control channel, the UE determines that a sub-band of the data channel is the same as a sub-band of the downlink control channel, or if the sub-band identifiers of the L sub-bands are different from sub-band identifiers of the downlink control channel, the UE determines, according to the frequency hopping pattern that is indicated by the fifth frequency hopping parameter set, the sub-bands specifically used by the data channel.

Further, after steps 301 to 304, the UE may continue to receive at least one of the second configuration information, the third configuration information, or the fourth configuration information that is sent by the base station, so that the UE further determines a frequency domain location used by the UE to send an uplink control channel and/or an uplink shared channel and/or a physical random access channel to the base station or to receive a downlink shared channel and/or a downlink control channel for scheduling the downlink shared channel that is/are sent by the base station. Configuration methods for the second configuration information, the third configuration information, and the fourth configuration information are described in detail in the foregoing embodiment, and therefore details are not described herein again.

This embodiment of the present invention provides a frequency domain resource configuration method. A base station first obtains a first frequency hopping parameter set of UE in N sub-bands. There is a mapping relationship between the N sub-bands and a frequency hopping pattern that is indicated by the first frequency hopping parameter set, that is, a frequency domain location of the N sub-bands configured by the base station for the UE changes in different time periods. Therefore, after the base station sends, to the UE, first configuration information that carries sub-band identifiers of the N sub-bands and the first frequency hopping parameter set, the UE may determine, according to the first configuration information, frequency domain resources used for communication with the base station at different moments. In this way, compared with the prior art in which the UE can use only one or more fixed frequency bands to communicate with the base station, in this solution, both quality of communication between the UE and the base station and resource utilization of each sub-band in a system bandwidth can be improved by using a frequency domain diversity gain.

Embodiment 3

Figure 10:
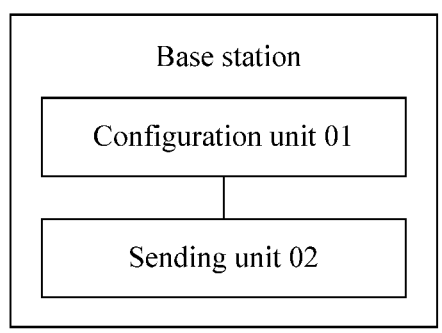
FIG. 10 is a schematic structural diagram of a base station according to an embodiment of the present invention.

As shown in FIG. 10, this embodiment of the present invention provides a base station, including a configuration unit O1, configured to obtain a first frequency hopping parameter set of UE in N sub-bands, where there is a mapping relationship between the N sub-bands and a frequency hopping pattern that is indicated by the first frequency hopping parameter set, the sub-band is a length of consecutive frequency domain resources in a system bandwidth, and N≥1, and a sending unit O2, configured to send first configuration information to the UE, where the first configuration information includes sub-band identifiers of the N sub-bands and the first frequency hopping parameter set.

Further, the configuration unit O1 is further configured to generate second configuration information according to the N sub-bands. The second configuration information includes sub-band identifiers of M sub-bands, any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data. The M sub-bands are any subset of the N sub-bands, and 1≤M≤N.

The sending unit O2 is further configured to send the second configuration information to the UE.

The second configuration information further includes a second frequency hopping parameter set. There is a mapping relationship between the M sub-bands and a frequency hopping pattern that is indicated by the second frequency hopping parameter set. The second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

Further, the sending unit O2 is further configured to send third configuration information to the UE. The third configuration information includes a third frequency hopping parameter set. There is a mapping relationship between H sub-bands and a frequency hopping pattern that is indicated by the third frequency hopping parameter set in the consecutive subframe time Y in which a frequency domain location does not change. The H sub-bands are any subset of the N sub-bands. The H sub-bands are used to transfer at least one of the following: unicast data between the base station and the UE, a downlink control channel for scheduling the unicast data, an uplink control channel for scheduling the unicast data, or a physical random access channel for scheduling the unicast data, and N≥H≥1.

The third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

Further, the sending unit O2 is further configured to send fourth configuration information to the UE. The fourth configuration information carries sub-band identifiers of K sub-bands. At least one of the K sub-bands does not belong to the N sub-bands. The K sub-bands are used to transfer at least one of the following: unicast data between the base station and the UE, a downlink control channel for scheduling the unicast data, an uplink control channel for scheduling the unicast data, or a physical random access channel for scheduling the unicast data, and K≥1.

The fourth configuration information further includes a fourth frequency hopping parameter set. There is a mapping relationship between the K sub-bands and a frequency hopping pattern that is indicated by the fourth frequency hopping parameter set. The fourth frequency hopping parameter set is determined by at least one of the following: the sub-band identifiers of the K sub-bands, a quantity K of the sub-bands, or the value of the frequency hopping parameter.

Further, the sending unit O2 is specifically configured to send the first configuration information to the UE according to a sixth frequency hopping parameter set. There is a mapping relationship between W sub-bands and a frequency hopping pattern that is indicated by the sixth frequency hopping parameter set. The W sub-bands are pre-stored on the base station, or carried in a master information block (MIB), and W≥1.

The sixth frequency hopping parameter set is determined by at least one of the following: sub-band identifiers of the W sub-bands, a quantity W of the sub-bands, or the value of the frequency hopping parameter.

Figure 11:
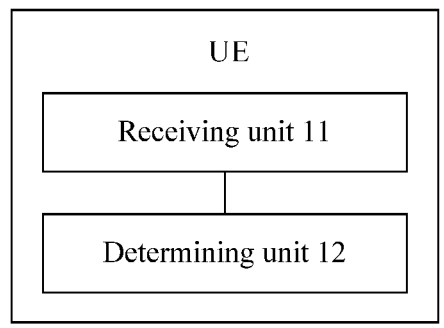
FIG. 11 is a schematic structural diagram of UE according to an embodiment of the present invention.

As shown in FIG. 11, this embodiment of the present invention provides UE, including a receiving unit 11, configured to receive first configuration information sent by a base station, where the first configuration information includes sub-band identifiers of N sub-bands and a first frequency hopping parameter set in the N sub-bands, there is a mapping relationship between the N sub-bands and a frequency hopping pattern that is indicated by the first frequency hopping parameter set, the sub-band is a length of consecutive frequency domain resources in a system bandwidth, and N≥1, and a determining unit 12, configured to determine, according to the sub-band identifiers of the N sub-bands and the first frequency hopping parameter set, a frequency domain resource used for communication with the base station.

Further, the receiving unit 11 is further configured to receive second configuration information sent by the base station. The second configuration information includes sub-band identifiers of M sub-bands. Any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data. The M sub-bands are any subset of the N sub-bands, and 1≤M≤N.

The determining unit 12 is further configured to determine, according to the second configuration information, a frequency domain resource used to send, to the base station, at least one of the following: the unicast data, the downlink control channel for scheduling the unicast data, the uplink control channel for scheduling the unicast data, or the physical random access channel for scheduling the unicast data. The unicast data carries a cyclic redundancy check CRC bit scrambled by using a specified radio network temporary identifier RNTI of the UE, and a transport block TB of the UE.

The second configuration information further includes a second frequency hopping parameter set. There is a mapping relationship between the M sub-bands and a second frequency hopping pattern that is indicated by the second frequency hopping parameter set. The second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

Further, the receiving unit 11 is further configured to receive third configuration information sent by the base station. The third configuration information includes a third frequency hopping parameter set. There is a mapping relationship between H sub-bands and a frequency hopping pattern that is indicated by the third frequency hopping parameter set in the consecutive subframe time Y in which a frequency domain location does not change. The H sub-bands are any subset of the N sub-bands, and N≥H≥1. The third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

The determining unit 12 is further configured to determine, according to the third frequency hopping parameter set, a frequency domain resource used for communication with the base station in the consecutive subframe time Y in which a frequency domain location does not change.

Further, the receiving unit 11 is further configured to receive fourth configuration information sent by the base station. The fourth configuration information carries sub-band identifiers of K sub-bands. At least one of the K sub-bands does not belong to the N sub-bands, and K≥1.

The determining unit 12 is further configured to determine, according to the fourth configuration information, a frequency domain resource used to transfer at least one of the following to the base station: the unicast data, the downlink control channel for scheduling the unicast data, the uplink control channel for scheduling the unicast data, or the physical random access channel for scheduling the unicast data.

The fourth configuration information further includes a fourth frequency hopping parameter set. There is a mapping relationship between the K sub-bands and a frequency hopping pattern that is indicated by the fourth frequency hopping parameter set. The fourth frequency hopping parameter set is determined by at least one of the following: the sub-band identifiers of the K sub-bands, a quantity K of the sub-bands, or the value of the frequency hopping parameter.

Further, the receiving unit 11 is further configured to obtain, from the downlink control channel, sub-band identifiers of L sub-bands of a data channel associated with the downlink control channel, where the L sub-bands are any sub-bands in the system bandwidth, and 1≤L; and obtain the fifth frequency hopping parameter set from the downlink control channel, or obtain the fifth frequency hopping parameter set from the first configuration information, the second configuration information, the third configuration information, or the fourth configuration information.

There is a mapping relationship between the L sub-bands and a frequency hopping pattern that is indicated by the fifth frequency hopping parameter set. The fifth frequency hopping parameter set is determined by a value/values of one or more of the frequency hopping parameters.

Further, the determining unit 12 is further configured to: if the sub-band identifiers of the L sub-bands are the same as sub-band identifiers of the downlink control channel, determine that a sub-band of the data channel is the same as a sub-band of the downlink control channel; or if the sub-band identifiers of the L sub-bands are different from sub-band identifiers of the downlink control channel, determine a sub-band of the data channel according to the fifth frequency hopping parameter set.

For a mechanism that achieves an objective of the present invention by using the base station and the user equipment provided in this embodiment of the present invention, refer to the methods in Embodiment 1 and Embodiment 2. Details are not described herein again.

This embodiment of the present invention provides a frequency domain resource configuration apparatus. A base station first obtains a first frequency hopping parameter set of UE in N sub-bands. There is a mapping relationship between the N sub-bands and a frequency hopping pattern that is indicated by the first frequency hopping parameter set, that is, a frequency domain location of the N sub-bands configured by the base station for the UE changes in different time periods. Therefore, after the base station sends, to the UE, first configuration information that carries sub-band identifiers of the N sub-bands and the first frequency hopping parameter set, the UE may determine, according to the first configuration information, frequency domain resources used for communication with the base station at different moments. In this way, compared with the prior art in which the UE can use only one or more fixed frequency bands to communicate with the base station, in this solution, both quality of communication between the UE and the base station and resource utilization of each sub-band in a system bandwidth can be improved by using a frequency domain diversity gain.

Embodiment 4

Figure 12:
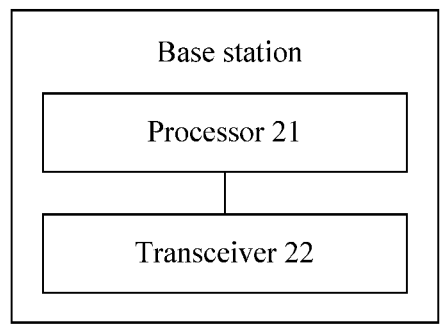
FIG. 12 is a schematic hardware diagram of a base station according to an embodiment of the present invention.

FIG. 12 is a schematic structural diagram of a base station according to this embodiment of the present invention. The base station provided in this embodiment of the present invention may be configured to implement the methods implemented in the embodiments of the present invention shown in FIG. 1 to FIG. 9. For ease of description, only a part related to this embodiment of the present invention is shown. For specific technical details that are not disclosed, refer to the embodiments of the present invention shown in FIG. 1 to FIG. 9.

Specifically, the base station includes a processor 21, and a transceiver 22 connected to the processor 21.

The processor 21 is configured to obtain a first frequency hopping parameter set of UE in N sub-bands, where there is a mapping relationship between the N sub-bands and a frequency hopping pattern that is indicated by the first frequency hopping parameter set, the sub-band is a length of consecutive frequency domain resources in a system bandwidth, and N≥1.

The transceiver 22 is configured to send first configuration information to the UE, where the first configuration information includes sub-band identifiers of the N sub-bands and the first frequency hopping parameter set.

Further, the processor 21 is further configured to generate second configuration information according to the N sub-bands. The second configuration information includes sub-band identifiers of M sub-bands. Any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data. The M sub-bands are any subset of the N sub-bands, and 1≤M≤N.

The transceiver 22 is further configured to send the second configuration information to the UE.

The second configuration information further includes a second frequency hopping parameter set. There is a mapping relationship between the M sub-bands and a frequency hopping pattern that is indicated by the second frequency hopping parameter set. The second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

Further, the transceiver 22 is further configured to send third configuration information to the UE. The third configuration information includes a third frequency hopping parameter set. There is a mapping relationship between H sub-bands and a frequency hopping pattern that is indicated by the third frequency hopping parameter set in the consecutive subframe time Y in which a frequency domain location does not change. The H sub-bands are any subset of the N sub-bands. The H sub-bands are used to transfer at least one of the following: unicast data between the base station and the UE, a downlink control channel for scheduling the unicast data, an uplink control channel for scheduling the unicast data, or a physical random access channel for scheduling the unicast data, and N≥H≥1.

The third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

Further, the transceiver 22 is further configured to send fourth configuration information to the UE. The fourth configuration information carries sub-band identifiers of K sub-bands. At least one of the K sub-bands does not belong to the N sub-bands. The K sub-bands are used to transfer at least one of the following: unicast data between the base station and the UE, a downlink control channel for scheduling the unicast data, an uplink control channel for scheduling the unicast data, or a physical random access channel for scheduling the unicast data, and K≥1.

The fourth configuration information further includes a fourth frequency hopping parameter set. There is a mapping relationship between the K sub-bands and a frequency hopping pattern that is indicated by the fourth frequency hopping parameter set. The fourth frequency hopping parameter set is determined by at least one of the following: the sub-band identifiers of the K sub-bands, a quantity K of the sub-bands, or the value of the frequency hopping parameter.

Further, the transceiver 22 is further configured to send the first configuration information to the UE according to a sixth frequency hopping parameter set. There is a mapping relationship between W sub-bands and a frequency hopping pattern that is indicated by the sixth frequency hopping parameter set. The W sub-bands are pre-stored on the base station, or carried in a master information block (MIB), and W≥1.

The sixth frequency hopping parameter set is determined by at least one of the following: sub-band identifiers of the W sub-bands, a quantity W of the sub-bands, or the value of the frequency hopping parameter.

Figure 13:
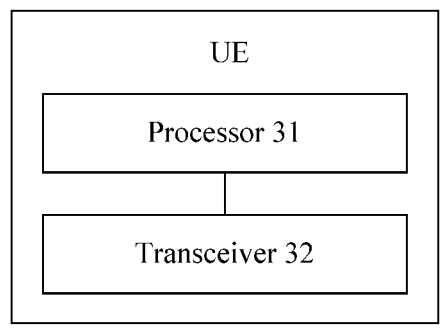
FIG. 13 is a schematic hardware diagram of UE according to an embodiment of the present invention.

FIG. 13 is a schematic structural diagram of UE according to this embodiment of the present invention. The UE provided in this embodiment of the present invention may be configured to implement the methods implemented in the embodiments of the present invention shown in FIG. 1 to FIG. 9. For ease of description, only a part related to this embodiment of the present invention is shown. For specific technical details that are not disclosed, refer to the embodiments of the present invention shown in FIG. 1 to FIG. 9.

Specifically, the UE includes a processor 31, and a transceiver 32 connected to the processor 31.

The transceiver 32 is configured to receive first configuration information sent by a base station. The first configuration information includes sub-band identifiers of N sub-bands and a first frequency hopping parameter set in the N sub-bands. There is a mapping relationship between the N sub-bands and a frequency hopping pattern that is indicated by the first frequency hopping parameter set. The sub-band is a length of consecutive frequency domain resources in a system bandwidth, and N≥1.

The processor 31 is configured to determine, according to the sub-band identifiers of the N sub-bands and the first frequency hopping parameter set, a frequency domain resource used for communication with the base station.

Further, the transceiver 32 is further configured to receive second configuration information sent by the base station. The second configuration information includes sub-band identifiers of M sub-bands. Any one of the M sub-bands is used to transfer at least one of the following: unicast data between the UE and the base station, a downlink control channel for scheduling the unicast data, an uplink control channel for scheduling the unicast data, or a physical random access channel for scheduling the unicast data. The M sub-bands are any subset of the N sub-bands, and 1≤M≤N.

The processor 31 is further configured to determine, according to the second configuration information, a frequency domain resource used to send at least one of the following to the base station: the unicast data, the downlink control channel for scheduling the unicast data, the uplink control channel for scheduling the unicast data, or the physical random access channel for scheduling the unicast data. The unicast data carries a cyclic redundancy check CRC bit scrambled by using a specified radio network temporary identifier RNTI of the UE, and a transport block TB of the UE.

The second configuration information further includes a second frequency hopping parameter set. There is a mapping relationship between the M sub-bands and a second frequency hopping pattern that is indicated by the second frequency hopping parameter set. The second frequency hopping parameter set is determined by at least one of the following: the sub-band identifiers of the N sub-bands, the quantity N of the sub-bands, the sub-band identifiers of the M sub-bands, a quantity M of the sub-bands, or the value of the frequency hopping parameter.

Further, the transceiver 32 is further configured to receive third configuration information sent by the base station. The third configuration information includes a third frequency hopping parameter set. There is a mapping relationship between H sub-bands and a frequency hopping pattern that is indicated by the third frequency hopping parameter set in the consecutive subframe time Y in which a frequency domain location does not change. The H sub-bands are any subset of the N sub-bands, and N≥H≥1. The third frequency hopping parameter set is determined by at least one of the following: the sub-band identifiers of the N sub-bands, the quantity N of the sub-bands, sub-band identifiers of the H sub-bands, a quantity H of the sub-bands, or the value of the frequency hopping parameter.

The processor 31 is further configured to determine, according to the third frequency hopping parameter set, a frequency domain resource used for communication with the base station in the consecutive subframe time Y in which a frequency domain location does not change.

Further, the transceiver 32 is further configured to receive fourth configuration information sent by the base station. The fourth configuration information carries sub-band identifiers of K sub-bands. At least one of the K sub-bands does not belong to the N sub-bands, and K≥1.

The processor 31 is further configured to determine, according to the fourth configuration information, a frequency domain resource used to transfer at least one of the following to the base station: the unicast data, the downlink control channel for scheduling the unicast data, the uplink control channel for scheduling the unicast data, or the physical random access channel for scheduling the unicast data.

The fourth configuration information further includes a fourth frequency hopping parameter set. There is a mapping relationship between the K sub-bands and a frequency hopping pattern that is indicated by the fourth frequency hopping parameter set. The fourth frequency hopping parameter set is determined by at least one of the following: the sub-band identifiers of the K sub-bands, a quantity K of the sub-bands, or the value of the frequency hopping parameter.

Further, the transceiver 32 is further configured to obtain, from the downlink control channel, sub-band identifiers of L sub-bands of a data channel associated with the downlink control channel, where the L sub-bands are any sub-bands in the system bandwidth, and 1≤L; and obtain the fifth frequency hopping parameter set from the downlink control channel, or obtain the fifth frequency hopping parameter set from the first configuration information, the second configuration information, the third configuration information, or the fourth configuration information.

There is a mapping relationship between the L sub-bands and a frequency hopping pattern that is indicated by the fifth frequency hopping parameter set. The fifth frequency hopping parameter set is determined by a value/values of one or more of the frequency hopping parameters.

Further, the processor 31 is further configured to: if the sub-band identifiers of the L sub-bands are the same as sub-band identifiers of the downlink control channel, determine that a sub-band of the data channel is the same as a sub-band of the downlink control channel; or if the sub-band identifiers of the L sub-bands are different from sub-band identifiers of the downlink control channel, determine a sub-band of the data channel according to the fifth frequency hopping parameter set.

For a mechanism that achieves an objective of the present invention by using the base station and the user equipment provided in this embodiment of the present invention, refer to the methods in Embodiment 1 and Embodiment 2. Details are not described herein again.

This embodiment of the present invention provides a frequency domain resource configuration apparatus. A base station first obtains a first frequency hopping parameter set of UE in N sub-bands. There is a mapping relationship between the N sub-bands and a frequency hopping pattern that is indicated by the first frequency hopping parameter set, that is, a frequency domain location of the N sub-bands configured by the base station for the UE changes in different time periods. Therefore, after the base station sends, to the UE, first configuration information that carries sub-band identifiers of the N sub-bands and the first frequency hopping parameter set, the UE may determine, according to the first configuration information, frequency domain resources used for communication with the base station at different moments. In this way, compared with the prior art in which the UE can use only one or more fixed frequency bands to communicate with the base station, in this solution, both quality of communication between the UE and the base station and resource utilization of each sub-band in a system bandwidth can be improved by using a frequency domain diversity gain.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims

What is claimed is:

1. A frequency domain resource configuration method, comprising:
obtaining, by a base station, a first frequency hopping parameter set of a user equipment (UE) in N sub-bands, wherein the N sub-bands have a mapping relationship with a frequency hopping pattern that is indicated by the first frequency hopping parameter set, wherein the sub-band is a length of consecutive frequency domain resources in a system bandwidth, and wherein N≥1;
sending, by the base station, first configuration information to the UE, wherein the first configuration information comprises sub-band identifiers of the N sub-bands and the first frequency hopping parameter set; and
communicating between the base station and the UE on first sub-bands selected by the UE from the N sub-bands;
wherein the first frequency hopping parameter set is determined by a quantity N of the sub-bands, and a value of a frequency hopping parameter; and
wherein the frequency hopping parameter comprises a consecutive subframe time Y in which a frequency domain location does not change, wherein Y>0.

2. The method according to claim 1, wherein the N sub-bands are used to transfer one or more of the following unicast data between the base station and the UE, a downlink control channel for scheduling the unicast data, an uplink control channel for scheduling the unicast data, a physical random access channel for scheduling the unicast data, a public message, a scheduling parameter for scheduling the public message, or a control channel carrying the scheduling parameter;
wherein the unicast data carries a cyclic redundancy check (CRC) bit scrambled by using a specified radio network temporary identifier (RNTI) of the UE, and a transport block (TB) of the UE; and
wherein the public message comprises at least one of system information (SI), a random access response (RAR), or paging information.

3. The method according to claim 1, further comprising performing, after the sending, by the base station, first configuration information to the UE:
generating, by the base station, second configuration information according to the N sub-bands, wherein the second configuration information comprises sub-band identifiers of M sub-bands, wherein any one of the M sub-bands is used to transfer at least one of unicast data between the UE and the base station, a downlink control channel for scheduling the unicast data, an uplink control channel for scheduling the unicast data, or a physical random access channel for scheduling the unicast data, and wherein the M sub-bands are any subset of the N sub-bands, and 1≤M≤N; and
sending, by the base station, the second configuration information to the UE;
wherein the first sub-bands are selected from the M sub-bands by the UE.

4. The method according to claim 1, further comprising performing, after the sending the first configuration information to the UE:
sending, by the base station, third configuration information to the UE, wherein the third configuration information comprises a third frequency hopping parameter set, wherein H sub-bands have a mapping relationship with a frequency hopping pattern that is indicated by the third frequency hopping parameter set in the consecutive subframe time Y in which a frequency domain location does not change, wherein the H sub-bands are any subset of the N sub-bands, and wherein the H sub-bands are used to transfer at least one of unicast data between the base station and the UE, a downlink control channel for scheduling the unicast data, an uplink control channel for scheduling the unicast data, or a physical random access channel for scheduling the unicast data, and N≥H≥1, and wherein the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter;
wherein the first sub-bands are selected from the H sub-bands by the UE.

5. A frequency domain resource configuration method, comprising:
receiving, by UE, first configuration information sent by a base station, wherein the first configuration information comprises sub-band identifiers of N sub-bands and a first frequency hopping parameter set in the N sub-bands, wherein the N sub-bands have a mapping relationship with a frequency hopping pattern that is indicated by the first frequency hopping parameter set, wherein the sub-band is a length of consecutive frequency domain resources in a system bandwidth, and wherein N≥1;
determining, by the UE according to the sub-band identifiers of the N sub-bands and the first frequency hopping parameter set, a frequency domain resource used for communication with the base station; and
communicating between the UE and the base station on first sub-bands that are in the frequency domain resource determined by the UE;
wherein the first frequency hopping parameter set is determined by a quantity N of the sub-bands, and a value of a frequency hopping parameter; and
wherein the frequency hopping parameter comprises a consecutive subframe time Y in which a frequency domain location does not change, and wherein Y>0.

6. The method according to claim 5, further comprising performing, after the determining, the frequency domain resource used for communication with the base station:
receiving, by the UE, second configuration information sent by the base station, wherein the second configuration information comprises sub-band identifiers of M sub-bands, any one of the M sub-bands is used to transfer at least one of unicast data between the UE and the base station, a downlink control channel for scheduling the unicast data, an uplink control channel for scheduling the unicast data, or a physical random access channel for scheduling the unicast data, wherein the M sub-bands are any subset of the N sub-bands, and 1≤M≤N; and
determining, by the UE according to the second configuration information, a frequency domain resource used to send, to the base station, at least one of the unicast data, the downlink control channel for scheduling the unicast data, the uplink control channel for scheduling the unicast data, or the physical random access channel for scheduling the unicast data, wherein the unicast data carries a cyclic redundancy check (CRC) bit scrambled using a specified radio network temporary identifier (RNTI) of the UE, and a transport block (TB) of the UE.

7. The method according to claim 5, further comprising performing, after the determining the frequency domain resource used for communication with the base station:

receiving, by the UE, third configuration information sent by the base station, wherein the third configuration information comprises a third frequency hopping parameter set, wherein H sub-bands have a mapping relationship with a frequency hopping pattern that is indicated by the third frequency hopping parameter set in the consecutive subframe time Y in which a frequency domain location does not change, wherein the H sub-bands are any subset of the N sub-bands, wherein N≥H≥1, and wherein the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter; and determining, by the UE according to the third frequency hopping parameter set, a frequency domain resource used for communication with the base station in the consecutive subframe time Y in which a frequency domain location does not change.

8. A base station, comprising:
a transceiver;
a processor; and
a non-transitory computer-readable storage medium storing a program to be executed by the processor, the program including instructions to:
obtain a first frequency hopping parameter set of UE in N sub-bands, wherein the N sub-bands have a mapping relationship with a frequency hopping pattern that is indicated by the first frequency hopping parameter set, wherein the sub-band is a length of consecutive frequency domain resources in a system bandwidth, and N≥1;
cause the transceiver to send first configuration information to the UE, wherein the first configuration information comprises sub-band identifiers of the N sub-bands and the first frequency hopping parameter set; and
communicate with the UE on first sub-bands selected by the UE from the N sub-bands;
wherein the first frequency hopping parameter set is determined by a quantity N of the sub-bands, and a value of a frequency hopping parameter; and
wherein the frequency hopping parameter comprises a consecutive subframe time Y in which a frequency domain location does not change, and wherein Y>0.

9. The base station according to claim 8, wherein the program further includes instructions to:
generate second configuration information according to the N sub-bands, wherein the second configuration information comprises sub-band identifiers of M sub-bands, wherein any one of the M sub-bands is used to transfer at least one of unicast data between the UE and the base station, a downlink control channel for scheduling the unicast data, an uplink control channel for scheduling the unicast data, or a physical random access channel for scheduling the unicast data, wherein the M sub-bands are any subset of the N sub-bands, and 1≤M≤N; and cause the transceiver to send the second configuration information to the UE, wherein the second configuration information further comprises a second frequency hopping parameter set, there is a mapping relationship between the M sub-bands and a frequency hopping pattern that is indicated by the second frequency hopping parameter set, and the second frequency hopping parameter set is determined by at least one of the sub-band identifiers of the N sub-bands, the quantity N of the sub-bands, the sub-band identifiers of the M sub-bands, a quantity M of the sub-bands, or the value of the frequency hopping parameter;

wherein the first sub-bands are selected from the M sub-bands by the UE.

10. The base station according to claim 8, wherein the program further includes instructions to cause the transceiver to send third configuration information to the UE, wherein the third configuration information comprises a third frequency hopping parameter set, wherein H sub-bands have a mapping relationship with a frequency hopping pattern that is indicated by the third frequency hopping parameter set in the consecutive subframe time Y in which a frequency domain location does not change, wherein the H sub-bands are any subset of the N sub-bands, the H sub-bands are used to transfer at least one of unicast data between the base station and the UE, a downlink control channel for scheduling the unicast data, an uplink control channel for scheduling the unicast data, or a physical random access channel for scheduling the unicast data, and wherein N≥H≥1; and wherein the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter;

wherein the first sub-bands are selected from the H sub-bands by the UE.

11. A user equipment (UE), comprising:
a transceiver, configured to receive first configuration information sent by a base station, wherein the first configuration information comprises sub-band identifiers of N sub-bands and a first frequency hopping parameter set in the N sub-bands, there is a mapping relationship between the N sub-bands and a frequency hopping pattern that is indicated by the first frequency hopping parameter set, the sub-band is a length of consecutive frequency domain resources in a system bandwidth, and N≥1;
a processor; and
a non-transitory computer-readable storage medium storing a program to be executed by the processor, the program including instructions to:
determine, according to the sub-band identifiers of the N sub-bands and the first frequency hopping parameter set, a frequency domain resource used for communication with the base station; and
communicate between with the base station on first sub-bands that are in the frequency domain resource determined by the UE;
wherein the first frequency hopping parameter set is determined by a quantity N of the sub-bands, and a value of a frequency hopping parameter; and wherein the frequency hopping parameter comprises a consecutive subframe time Y in which a frequency domain location does not change, and wherein Y>0.

12. The UE according to claim 11, wherein the transceiver further configured to receive second configuration information sent by the base station, wherein the second configuration information comprises sub-band identifiers of M sub-bands, any one of the M sub-bands is used to transfer at least one of unicast data between the UE and the base station, a downlink control channel for scheduling the unicast data, an uplink control channel for scheduling the unicast data, or a physical random access channel for scheduling the unicast data, wherein the M sub-bands are any subset of the N sub-bands, and $1 \leq M \leq N$;

wherein the program further includes instructions to determine, according to the second configuration information, a frequency domain resource used to send, to the base station, at least one of the unicast data, the downlink control channel for scheduling the unicast data, the uplink control channel for scheduling the unicast data, or the physical random access channel for scheduling the unicast data;

wherein the unicast data carries a cyclic redundancy check (CRC) bit scrambled using a specified radio network temporary identifier (RNTI) of the UE, and a transport block (TB) of the UE; and wherein the second configuration information further comprises a second frequency hopping parameter set, wherein the M sub-bands have a mapping relationship with a second frequency hopping pattern that is indicated by the second frequency hopping parameter set, and wherein the second frequency hopping parameter set is determined by at least one of the sub-band identifiers of the N sub-bands, the quantity N of the sub-bands, the sub-band identifiers of the M sub-bands, a quantity M of the sub-bands, or the value of the frequency hopping parameter.

13. The UE according to claim 11, wherein the transceiver is further configured to receive third configuration information sent by the base station, wherein the third configuration information comprises a third frequency hopping parameter set, wherein H sub-bands have a mapping relationship with a frequency hopping pattern that is indicated by the third frequency hopping parameter set in the consecutive subframe time Y in which a frequency domain location does not change, the H sub-bands are any subset of the N sub-bands, $N \geq H \geq 1$, and the third frequency hopping parameter set is determined by at least one of the sub-band identifiers of the N sub-bands, the quantity N of the sub-bands, sub-band identifiers of the H sub-bands, a quantity H of the sub-bands, or the value of the frequency hopping parameter; and wherein the transceiver is further configured to determine, according to the third frequency hopping parameter set, a frequency domain resource used for communication with the base station in the consecutive subframe time Y in which a frequency domain location does not change.

* * * * *